(12) United States Patent
Xiong et al.

(10) Patent No.: US 10,985,876 B2
(45) Date of Patent: Apr. 20, 2021

(54) DETERMINATION OF NEW RADIO (NR) PHYSICAL UPLINK CONTROL CHANNEL (PUCCH) RESOURCE FOR HYBRID AUTOMATIC REPEAT REQUEST ACKNOWLEDGEMENT (HARQ-ACK) FEEDBACK

(71) Applicant: Apple Inc., Cupertino, CA (US)

(72) Inventors: Gang Xiong, Portland, OR (US); Hong He, Sunnyvale, CA (US); Debdeep Chatterjee, San Jose, CA (US); Joonyoung Cho, Portland, OR (US); Seung Hee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/482,758

(22) PCT Filed: Mar. 13, 2018

(86) PCT No.: PCT/US2018/022149
§ 371 (c)(1),
(2) Date: Aug. 1, 2019

(87) PCT Pub. No.: WO2018/169937
PCT Pub. Date: Sep. 20, 2018

(65) Prior Publication Data
US 2019/0393992 A1    Dec. 26, 2019

Related U.S. Application Data

(60) Provisional application No. 62/570,011, filed on Oct. 9, 2017, provisional application No. 62/475,469, filed
(Continued)

(51) Int. Cl.
*H04L 1/18*    (2006.01)
*H04L 5/00*    (2006.01)

(52) U.S. Cl.
CPC .......... *H04L 1/1812* (2013.01); *H04L 1/1858* (2013.01); *H04L 1/1861* (2013.01);
(Continued)

(58) Field of Classification Search
CPC ... H04L 1/1812; H04L 1/1858; H04L 1/1861; H04L 5/0007; H04L 5/0044; H04L 5/0055
See application file for complete search history.

(56) References Cited

U.S. PATENT DOCUMENTS 8,625,442 B2 *  1/2014  Ratasuk .............. H04W 74/085
                                                            370/252
9,467,257 B2 * 10/2016  Papasakellariou .. H04W 72/042
(Continued)

FOREIGN PATENT DOCUMENTS

WO    2016/161629  A1    10/2016

OTHER PUBLICATIONS

M. Wang et al., "The Evolution of LTE Physical Layer Control Channels," in IEEE Communications Surveys & Tutorials, vol. 18, No. 2, pp. 1336-1354, Secondquarter 2016. (Year: 2016).*
(Continued)

*Primary Examiner* — Cynthia Britt
(74) *Attorney, Agent, or Firm* — Eschweiler & Potashnik, LLC

(57) ABSTRACT

An apparatus configured to be employed in a user equipment (UE) associated with a new radio (NR) system is disclosed. The apparatus comprises a processing circuit configured to determine an NR-physical uplink control channel (PUCCH) resource to be utilized by the UE, for a transmission of a hybrid automatic repeat request (HARQ)-acknowledge (ACK) feedback message to a gNodeB, wherein the determined NR-PUCCH resource comprises a HARQ-PUCCH resource. In some embodiments, the HARQ-ACK feedback
(Continued)

Example UE message comprises a feedback message generated at the UE in response to processing a downlink (DL) data transmission signal comprising data received from the gNodeB. In some embodiments, the processing circuit is further configured to generate a transmission of the HARQ-ACK feedback message using the determined HARQ-PUCCH resource.

32 Claims, 14 Drawing Sheets

Related U.S. Application Data on Mar. 23, 2017, provisional application No. 62/471,694, filed on Mar. 15, 2017.

(52) U.S. Cl.
CPC .......... *H04L 5/0007* (2013.01); *H04L 5/0044* (2013.01); *H04L 5/0055* (2013.01)

(56) References Cited

U.S. PATENT DOCUMENTS 10,440,706 B2 * 10/2019 Yin ................... H04W 72/0446
2016/0345201 A1 * 11/2016 Chen ..................... H04L 1/1861
2016/0353440 A1    12/2016 Lee et al.

OTHER PUBLICATIONS

M. Lichtman, T. Czauski, S. Ha, P. David and J. H. Reed, "Detection and Mitigation of Uplink Control Channel Jamming in LTE," 2014 IEEE Military Communications Conference, Baltimore, MD, 2014, pp. 1187-1194. (Year: 2014).*
International Search Report dated Jun. 12, 2018 for International Application No. PCT/US2018/022149.
"All about Wired and Wireless Technology: Random Access Procedure in LTE." 9 pages.
"Hybrid automatic repeat request." Wikipedia. 5 pages.
"LTE Random Access Procedure." 5 pages.
"What is Retransmission, ARQ and HARQ?" telecomHall. 14 pages.
International Preliminary Report on Patentability dated Sep. 27, 2019 for International Application No. PCT/US2018/022149.

* cited by examiner

Example UE

DETERMINATION OF NEW RADIO (NR) PHYSICAL UPLINK CONTROL CHANNEL (PUCCH) RESOURCE FOR HYBRID AUTOMATIC REPEAT REQUEST ACKNOWLEDGEMENT (HARQ-ACK) FEEDBACK

REFERENCE TO RELATED APPLICATIONS

This application is a National Phase entry application of International Patent Application No. PCT/US2018/022149 filed Mar. 13, 2018, which claims priority to provisional Application No. 62/471,694, filed Mar. 15, 2017, entitled "DETERMINATION OF NEW RADIO (NR) PHYSICAL UPLINK CONTROL CHANNEL(PUCCH) RESOURCE FOR HYBRID AUTOMATIC REPEAT REQUEST ACKNOWLEDGEMENT (HARQ-ACK) FEEDBACK", provisional Application No. 62/475,469, filed Mar. 23, 2017, entitled "RADIO (NR) PHYSICAL UPLINK CONTROL CHANNEL (PUCCH) RESOURCE FOR HYBRID AUTOMATIC REPEAT REQUEST (HARQ)-ACKNOWLEDGEMENT (ACK)FEEDBACK DETERMINATION", and provisional Application No. 62/570,011, filed Oct. 9, 2017, entitled "PHYSICAL UPLINK CONTROL CHANNEL (PUCCH) RESOURCE FOR HYBRID AUTOMATIC REPEAT REQUEST (HARQ)-ACKNOWLEDGEMENT (ACK) FEEDBACK DETERMINATION", and is hereby incorporated by reference in its entirety.

FIELD

The present disclosure relates to the field of new radio (NR) systems, and in particular, to a method for determining a NR physical uplink control channel (PUCCH) resource for hybrid automatic repeat request acknowledgement (HARQ-ACK) feedback in NR communication systems.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR is evolved based on 3GPP LTE-Advanced with additional potential new Radio Access Technologies (RATs) to enrich people lives with better, simple and seamless wireless connectivity solutions.

In order to enable reliable delivery of digital data over unreliable communication channels, various error correction techniques, for example, hybrid automatic repeat request (HARQ) operation, are employed in NR communication systems. HARQ is an error correction method for data transmission that makes use of error-detection codes, acknowledgement and/or negative acknowledgement messages. In particular, in HARQ operation, a receiver (e.g., a user equipment) sends a HARQ feedback message to a transmitter (e.g., a gNodeB) based on a receipt of a data frame at the receiver. For example, when the data frame is received correctly at the receiver, the receiver is configured to send a HARQ-acknowledge (ACK) feedback message and when the data frame is not received correctly at the receiver, the receiver is configured to send a HARQ-NACK feedback message. However, in some embodiments, information on an NR physical uplink control channel (PUCCH) resource to be utilized for a transmission of the HARQ feedback message is not available at the receiver (i.e., the UE).

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
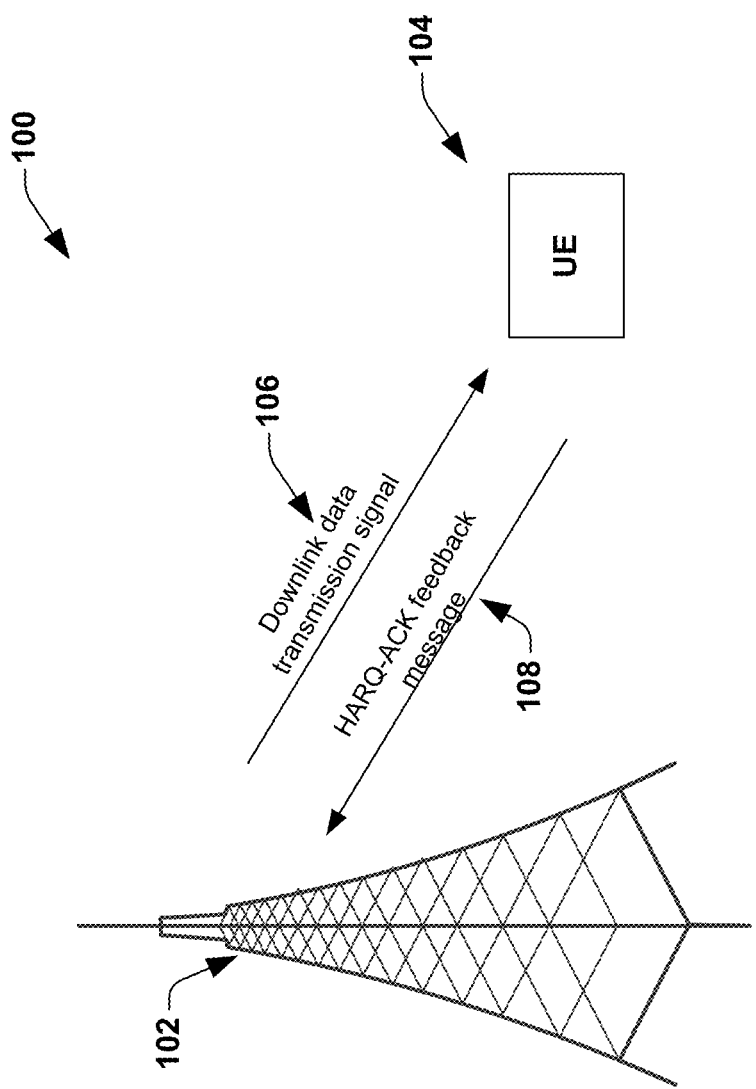
FIG. 1 illustrates a simplified block diagram of a new radio (NR) communication system, according to one embodiment of the disclosure.

In one embodiment of the disclosure, an apparatus configured to be employed in a user equipment (UE) associated with a new radio (NR) communication system is disclosed. The apparatus comprises a processing circuit configured to determine an NR-physical uplink control channel (PUCCH) resource to be utilized by the UE for a transmission of a hybrid automatic repeat request (HARQ)-acknowledge (ACK) feedback message to a gNodeB. In some embodiments, the HARQ-ACK feedback message comprises a feedback message generated at the UE in response to processing a downlink (DL) data transmission signal comprising data received from the gNodeB. In some embodiments, the determined NR-PUCCH resource comprises a HARQ-PUCCH resource. In some embodiments, the processing circuit is further configured to generate a transmission of the HARQ-ACK feedback message using the determined HARQ-PUCCH resource. In some embodiments, the apparatus further comprises a radio frequency (RF) interface, configured to provide the generated transmission of the HARQ-ACK feedback message, to an RF circuitry, in order to subsequently provide the HARQ-ACK feedback message to the gNodeB.

In one embodiment of the disclosure, an apparatus configured to be employed in a next generation Node B (gNodeB) associated with a new radio (NR) communication system is disclosed. The apparatus comprises a processing circuitry configured to determine a configuration information comprising one or more configuration parameters that define an NR physical uplink control channel (PUCCH) resource, to be provided to a UE, in order to enable the UE to determine the NR PUCCH resource. In some embodiments, the NR PUCCH resource comprises a hybrid automatic repeat request (HARQ)-PUCCH resource, to be utilized by the UE for a transmission of a HARQ-acknowledge (ACK) feedback message to the gNodeB, and the HARQ-ACK feedback message comprises a feedback message generated at the UE in response to processing a downlink (DL) data transmission signal comprising data received from the gNodeB. In some embodiments, the processing circuit is further configured to generate one or more DL signals comprising at least a part of the configuration information, to be provided to the UE, in order to enable the UE to determine the HARQ-PUCCH resource. In some embodiments, the apparatus further comprises a radio frequency (RF) interface, configured to provide the one or more DL signals, to an RF circuitry, for subsequent transmission to the UE.

In one embodiment of the disclosure, an apparatus configured to be employed in a next generation Node B (gNodeB) associated with a new radio (NR) communication system is disclosed. The apparatus comprises a processing circuitry configured to determine a resource set association associated with one or more predetermined resource sets comprising a set of resources associated with the NR communication system, to be provided to a UE, in order to enable the UE to determine an NR PUCCH resource, comprising a hybrid automatic repeat request (HARQ)-PUCCH resource, to be utilized by the UE for a transmission of a HARQ-acknowledge (ACK) feedback message to the gNodeB. In some embodiments, the HARQ-ACK feedback message comprises a feedback message generated at the UE in response to processing a downlink (DL) data transmission signal comprising data received from the gNodeB. In some embodiments, the processing circuit is further configured to generate one or more DL signals comprising information on the determined resource set association, in order to provide the information on the determined resource set association to the UE. In some embodiments, the apparatus further comprises a radio frequency (RF) interface, configured to provide the one or more DL signals, to an RF circuitry, for subsequent transmission to the UE.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form.

Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the next generation wireless communication system, 5G, or new radio (NR) will provide access to information and sharing of data anywhere, anytime by various users and applications. In order to enable reliable delivery of digital data over unreliable communication channels in NR, HARQ operation is employed in NR communication systems. In HARQ operation, a HARQ feedback message is transmitted from a receiver (e.g. a UE) to a transmitter (e.g., a gNodeB), in response to receiving a downlink data transmission signal at the UE from the gNodeB. In particular, the UE is configured to transmit a HARQ-ACK feedback message, in response to receiving the DL downlink data signal correctly at the UE. Further, the UE is configured to transmit a HARQ-NACK feedback message, in response to receiving the DL downlink data signal incorrectly at the UE. In the embodiments described throughout the disclosure, the HARQ feedback message is referred to as a HARQ-ACK feedback message. In other words, the term HARQ-ACK feedback message is used herein to refer to both the HARQ-ACK feedback message and the HARQ-NACK feedback message, and is not to be construed to be limiting.

Further, as indicated above, in some embodiments, an NR PUCCH resource to be utilized by the UE in order to transmit the HARQ-ACK feedback message to the gNodeB is not available at the UE. Therefore, in order to transmit the HARQ-ACK message to the gNodeB, information on the NR PUCCH resource to be utilized to transmit the HARQ-ACK feedback message has to be available at the UE. Therefore, in this disclosure, a UE configured to determine an NR PUCCH resource to be utilized to transmit the HARQ-ACK feedback message is disclosed. In the embodiments described herein, the NR PUCCH resource utilized to transmit the HARQ-ACK feedback message is referred to as a HARQ-PUCCH resource for the ease of reference. Further, a plurality of methods utilized by the UE in order to determine the HARQ-PUCCH resource is disclosed in the various embodiments herein. In some embodiments, the HARQ-PUCCH resource is determined at the UE to transmit a HARQ-ACK feedback message, in response to a DL data transmission signal received at the UE, prior to an establishment of a radio resource control (RRC) connection between the UE and the gNodeB. However, in other embodiments, the HARQ-PUCCH resource may be determined at the UE to transmit a HARQ-ACK feedback message, in response to a DL data transmission signal received at the UE, after an establishment of a radio resource control (RRC) connection between the UE and the gNodeB.

Figure 2:
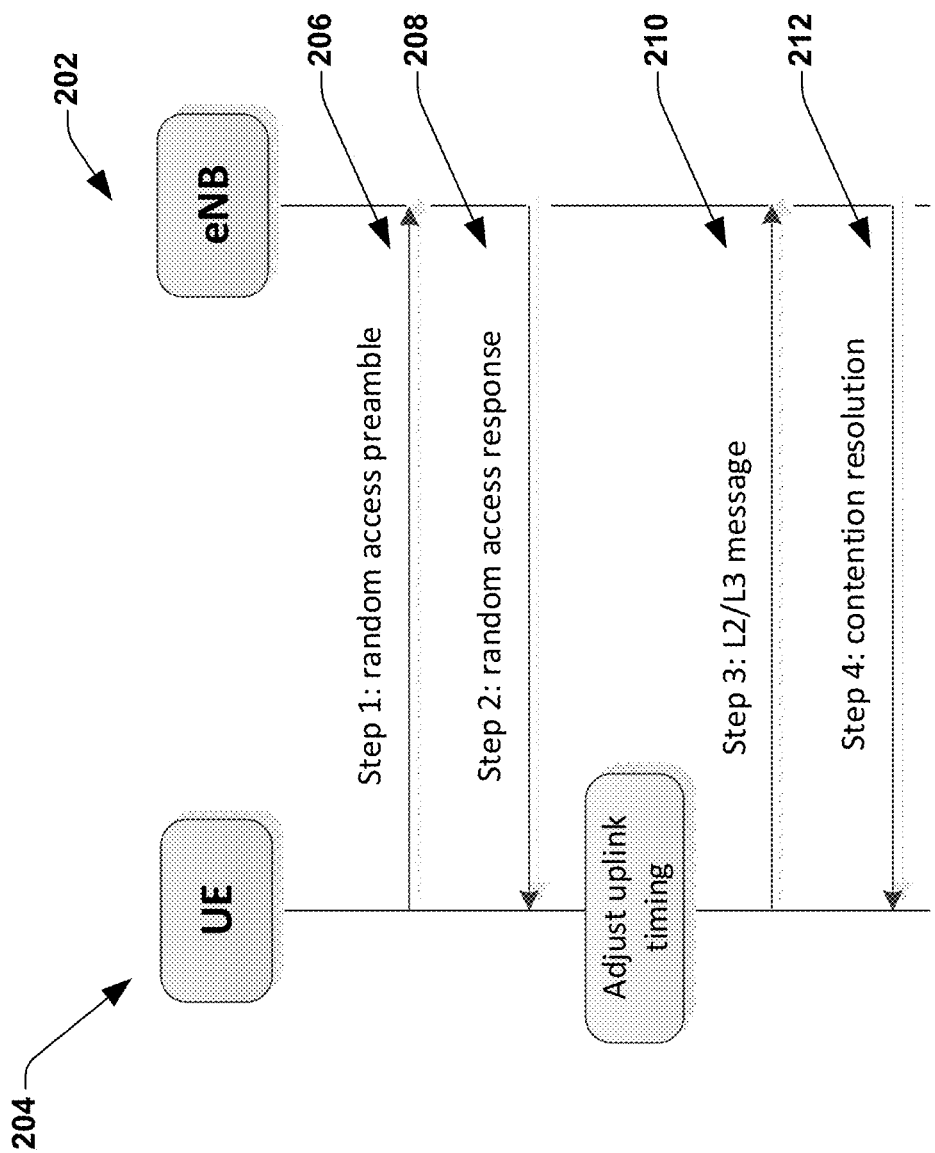
FIG. 2 illustrates a random access (RACH) procedure associated with a new radio (NR) communication system, according to one embodiment of the disclosure.

FIG. 1 illustrates a simplified block diagram of a new radio (NR) communication system 100, according to one embodiment of the disclosure. The NR communication system 100 comprises a gNodeB 102 and a user equipment (UE) 104. However, in other embodiments, the NR communication system 100 can comprise a plurality of gNodeBs and UEs. In some embodiments, the gNodeB 102 is equivalent to a base station, an eNodeB in LTE etc. In some embodiments, the UE 104 may comprise a mobile phone, tablet computer etc. The gNodeB 102 and the UE 104 are configured to communicate with one another over a communication medium (e.g., air). In some embodiments, the gNodeB 102 is configured to transmit a downlink data transmission signal 106 comprising data to the UE 104. In some embodiments, the DL data transmission signal 106 comprises a UE specific DL data signal (e.g., unicast transmission) provided to the UE 104 from the gNodeB 102. In some embodiments, the DL data transmission signal 106 comprises a UE specific DL data signal provided to the UE 104, prior to an establishment of a radio resource control (RRC) connection between the UE 104 and the gNodeB 102 (e.g., a message 4 or a contention resolution message 212 associated with a random access (RACH) procedure, as shown in FIG. 2). However, in other embodiments, the DL data transmission signal 106 can comprise any UE specific DL data signal, for example a UE specific DL data signal provided to the UE 104, after an establishment of a radio resource control (RRC) connection between the UE 104 and the gNodeB 102.

In order to increase the reliability of communication between the gNodeB 102 and the UE 104, in some embodiments, the NR communication system 100 is configured to employ a hybrid automatic repeat request (HARQ) operation. In order to implement the HARQ operation, in some embodiments, the UE 104 is configured to generate a HARQ-ACK feedback message 108, in response to receiving the DL data transmission signal 106 at the UE. In some embodiments, the HARQ-ACK feedback message 108 comprises an acknowledgement/negative acknowledgment message configured to indicate to the gNodeB 102 about the status of the receipt of the DL data transmission signal 106 at the UE 104. As indicated above, the HARQ-ACK feedback message indicated herein is used to refer to both a HARQ-ACK feedback message and a HARQ-NACK feedback message.

Figure 3:
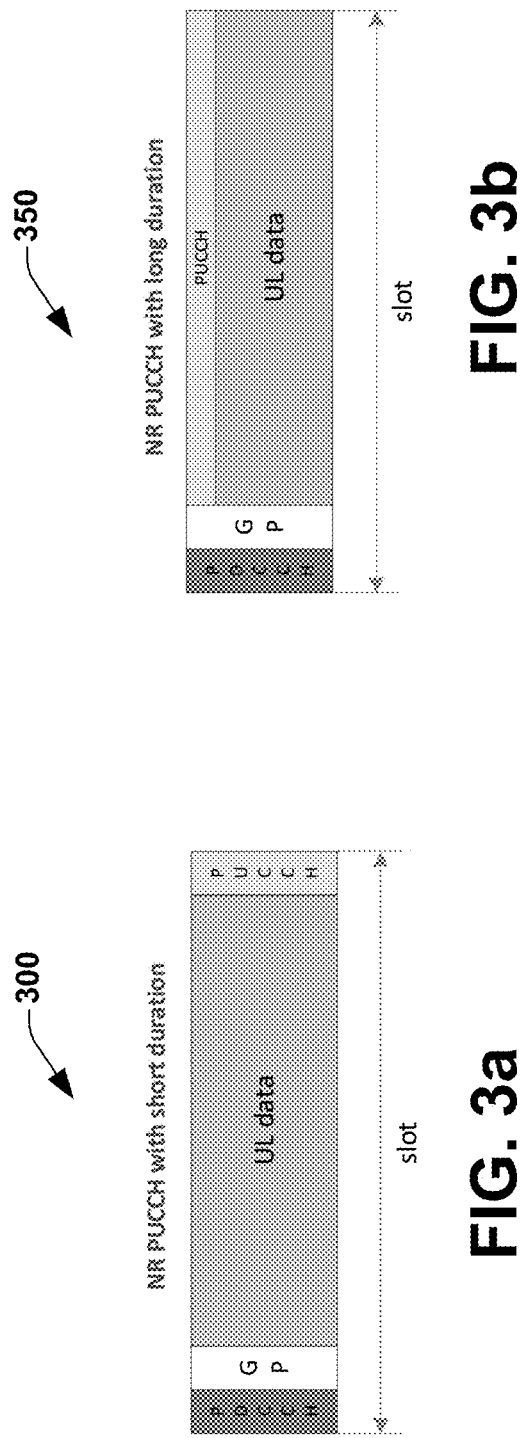
FIG. 3a and FIG. 3b illustrates a new radio (NR) physical uplink control channel (PUCCH) resource with short duration and long duration within an uplink slot, respectively, according to one embodiment of the disclosure.

In some embodiments, once the HARQ-ACK feedback message 106 is generated at the UE 104, the UE 104 is further configured to transmit the HARQ-ACK feedback message 108 to the gNodeB 102. In some embodiments, the HARQ-ACK feedback message 108 is transmitted over an NR physical uplink control channel (PUCCH). In some embodiments, NR PUCCH comprises an uplink control channel within an uplink (UL) slot associated with a data frame. In some embodiments, the NR PUCCH comprises an NR PUCCH with short duration as shown in FIG. 3a. For NR PUCCH with short duration, NR PUCCH and physical uplink shared channel (PUSCH) are multiplexed in a time division multiplexing (TDM) manner, which can be targeted for low latency application. Further, in some embodiments, the NR PUCCH comprises an NR PUCCH with long duration as shown in FIG. 3b. For NR PUCCH with long duration, multiple OFDM symbols can be allocated for NR PUCCH to improve link budget and uplink coverage for control channel. More specifically, for UL data slot, NR PUCCH and PUSCH can be multiplexed in a frequency division multiplexing (FDM) fashion.

In some embodiments, information on an NR PUCCH resource to be utilized by the UE 104 in order to transmit the HARQ-ACK feedback message 108 to the gNodeB 102 is not available to the UE 104. For instance, in some embodiments, prior to an establishment of the RRC connection between the UE 104 and the gNodeB 102, information on UE specific resources to be utilized by the UE 104 are not available to the UE 104. For example, referring to FIG. 2, when the contention resolution message 212 is received at the UE (e.g., the UE 204 in FIG. 2), the UE 204 does not have the information on the HARQ-PUCCH resource to be utilized by the UE 204, in order to transmit a HARQ-ACK feedback message (generated in response to receiving the contention resolution message 212 at the UE 204) back to the gNodeB 202.

Further, in some embodiments, even after RRC connection is established between the UE 104 and the gNodeB 102, the UE 104 may not have information on an NR PUCCH resource to be utilized by the UE 104 in order to transmit the HARQ-ACK feedback message 108 to the gNodeB 102. Therefore, in some embodiments, the UE 104 is further configured to determine an NR PUCCH resource to be utilized by the UE 104 in order to transmit the HARQ-ACK feedback message 108 to the gNodeB 102, prior to transmitting the HARQ-ACK feedback message 108 to the gNodeB 104. In the embodiments described herein, the NR PUCCH resource to be utilized by the UE 104 in order to transmit the HARQ-ACK feedback message 108 to the gNodeB 102 is referred to as a HARQ-PUCCH resource.

In one embodiment, the UE 104 is configured to determine the HARQ-PUCCH resource based on processing a configuration information comprising a HARQ-PUCCH resource configuration information received from the gNodeB 102, further details of which are explained below with reference to FIG. 4. In some embodiments, the HARQ-PUCCH resource configuration information comprises a set of HARQ-PUCCH resource configuration parameters that define the HARQ-PUCCH resource. In some embodiments, the HARQ-PUCCH resource configuration information is determined at the gNodeB 102. In such embodiments, the gNodeB 102 is configured to determine the HARQ-PUCCH resource configuration information and provide the determined HARQ-PUCCH resource configuration information to the UE 104, in order to enable the UE 104 to determine the HARQ-PUCCH resource to be utilized to transmit the HARQ-ACK feedback message 108 to the gNodeB 102.

In some embodiments, the set of HARQ-PUCCH resource configuration parameters associated with the HARQ-PUCCH resource configuration information comprises information on NR PUCCH resources in time, frequency and/or code domain, which may include one or more following parameters:

Information indicating either short or long NR PUCCH is configured for HARQ-ACK feedback for the DL data transmission signal 106 (e.g., the contention resolution message 212 in FIG. 2).

Starting symbol and/or duration of NR PUCCH with long duration

Whether 1 symbol or 2 symbols is used for NR PUCCH with short duration and corresponding symbol position.

Frequency resource for the transmission of NR PUCCH with short or long duration

Information whether frequency hopping is applied for the transmission of NR PUCCH with short or long duration.

Cyclic shift index and/or orthogonal cover code (OCC) index for the transmission of NR PUCCH with short or long duration ackNackRepetition: Parameter indicating whether HARQ-ACK repetition is configured. If the field is not configured, the UE shall apply the default value as defined in 3GPP specifications.

The number of PUCCH repetitions for NR PUCCH carrying HARQ response to PDSCH containing the DL data transmission signal 106 for PRACH. If absent, UE assumes no PUCCH repetition in response to PDSCH containing the DL data transmission signal 106.

However, the set of HARQ-PUCCH resource configuration parameters can comprise other parameters different from the above parameters, in some embodiments. In some embodiments, the gNodeB 102 is configured to provide the HARQ-PUCCH resource configuration information to the UE 104 as part of one or more DL signals associated with the gNodeB 102, further details of which are shown in FIG. 4. In some embodiments, FIG. 4 illustrates an example implementation of an NR communication system 400 that utilizes HARQ-PUCCH resource configuration information in order to determine the HARQ-PUCCH resource, according to one embodiment of the disclosure. In some embodiments, the NR communication system 400 depicts one possible way of implementation of the NR communication system 100 in FIG. 1. The NR communication system 400 comprises a gNodeB 402 and a UE 404. The gNodeB 402 is configured to provide a DL data transmission signal 406 to the UE 404. In some embodiments, the UE 404 is configured to generate a HARQ-ACK feedback message 408 to be provided to the gNodeB 402, in response to receiving the DL data transmission signal 406 from the gNodeB 402. In some embodiments, the UE 404 is further configured to determine the HARQ-PUCCH resource to be utilized by the UE 404 to transmit the HARQ-ACK feedback message 408 to the gNodeB 402. In some embodiments, the DL data transmission signal 406 is same as the DL data transmission signal 106 in FIG. 1 and the HARQ-ACK feedback message 408 is same as the HARQ-ACK feedback message 108 in FIG. 1.

In some embodiments, the gNodeB 402 is further configured to generate a random access response (RAR) message 412 comprising one or more parameters of the set of HARQ-PUCCH resource configuration parameters associated with the HARQ-PUCCH resource configuration information and provide the RAR message 412 to the UE 404, in order to enable the UE 404 to determine the HARQ-PUCCH resource for the transmission of the HARQ-ACK feedback message 408 to the gNodeB 402. In such embodiments, the UE 404 is further configured to process the RAR message 414, in order to determine the HARQ-PUCCH resource. In some embodiments, the RAR message 414 is associated with a RACH procedure and is similar to the RAR message 202 shown in FIG. 2. In some embodiments, it is assumed that some of the parameters associated with the set of HARQ-PUCCH resource configuration parameters is predefined and is available to the UE 404 even without any information exchange from the gNodeB 402. For example, in some embodiments, the information that a HARQ-ACK feedback message for the message 4 associated with a RACH procedure is carried by NR PUCCH with long duration, is available at the UE 404 without any signaling from the gNodeB 402.

In some embodiments, gNodeB 402 may be configured to provide only a first part of the set of the HARQ-PUCCH resource configuration parameters as part of the RAR message 412. In such embodiments, gNodeB 402 is further configured to include a second different part of the set of the HARQ-PUCCH resource configuration parameters as part of a downlink control information (DCI) 414 utilized for the scheduling of the DL data transmission signal 406. In such embodiments, the UE 404 is configured to process both the RAR message 412 and the DCI 414, in order to determine the HARQ-PUCCH resource.

Alternately, in some embodiments, the gNodeB 402 may be configured to provide a part of the set of the HARQ-PUCCH resource configuration parameters to the UE 404 as part of a system broadcast signal 410 generated at the gNodeB 402 and another part of the set of the HARQ-PUCCH resource configuration parameters as part of the RAR message 412 or the DCI 414, or both. In some embodiments the system broadcast signal 410 comprises a NR minimum system information (MSI) or remaining minimum system information (RMSI) or other system information (OSI) or other broadcast signals defined for NR communication systems, or a combination thereof. For example, in some embodiments, an RMSI is utilized by the gNodeB 402 to provide a set of the HARQ-PUCCH resource configuration parameters that provide information on a set of NR PUCCH resources and a DCI is utilized by the gNodeB 402 to provide one or more HARQ-PUCCH resource configuration parameters that indicate a selected NR PUCCH resource from the set of NR PUCCH resources to be utilized for the transmission of the HARQ-ACK feedback message. In such embodiments, the UE 404 is configured to process the system broadcast signal 410 (e.g., the RMSI) and the RAR message 412 or the DCI 414, or both in order to determine the HARQ-PUCCH resource.

The above combination of signals utilized to provide the HARQ-PUCCH resource configuration information, however, is not to be construed as limiting and in other embodiments, each of the above signals by themselves or a different combination of signals may be utilized by the gNodeB 402 to provide the HARQ-PUCCH resource configuration information to the UE 404. Further, in some embodiments, other DL signals (e.g., dedicated signals or RRC signaling) different from the RAR message 412, the system broadcast signal 410 and the DCI 414 may be utilized by the gNodeB 402, in order to provide the set of the HARQ-PUCCH resource configuration parameters to the UE 404. Furthermore, in this example embodiment, the DL signals comprising the set of the HARQ-PUCCH resource configuration parameters are shown to be provided to the UE 404 from the gNodeB 402, before the DL data transmission signal 406 is transmitted from the gNodeB 402 to the UE 404. However, in other embodiments, the gNodeB 402 may be configured to provide a DL signal comprising the set of the HARQ-PUCCH resource configuration parameters to the UE 404, after the DL data transmission signal 406 is provided to the UE 404. In some embodiments, gNodeB 402 is further configured to provide information on a subband to define NR PUCCH region as part of the system broadcast signal 410, wherein the NR PUCCH region comprises the HARQ-PUCCH resource for the transmission of HARQ-ACK feedback. In such embodiments, the UE 404 is configured to determine the HARQ-PUCCH resource within the subband, based on the set of HARQ-PUCCH resource configuration parameters received from the gNodeB 402.

Referring to FIG. 1 again, in some embodiments, the UE 104 is configured to determine the HARQ-PUCCH resource based on a predefined resource set association associated with one or more resource sets associated with the NR communication system 100. In some embodiments, a resource set comprises a plurality of resources associated with the NR communication system 100. In particular, in this embodiment, the predefined resource set association comprises a resource set association between predetermined sets of at least two of physical random access channel (PRACH) resource sets, DL control resource sets and NR PUCCH resource sets, further details of which are given below with reference to FIG. 5. In some embodiments, the PRACH resource set comprises a set of PRACH resources to be utilized by a UE (e.g., the UE 104) to transmit a PRACH preamble, the DL control resource set comprises a set NR physical downlink control channel (PDCCH) resources associated with the UE 104 (or the NR communication system 100) and the NR PUCCH resource set comprises a set NR PUCCH resources available to the UE 104. In some embodiments, the predefined resource set association between the PRACH resource sets, the DL control resource sets and the NR PUCCH resource sets comprises a one-to-one or a one-to-many association.

Figures 6A, 6B:
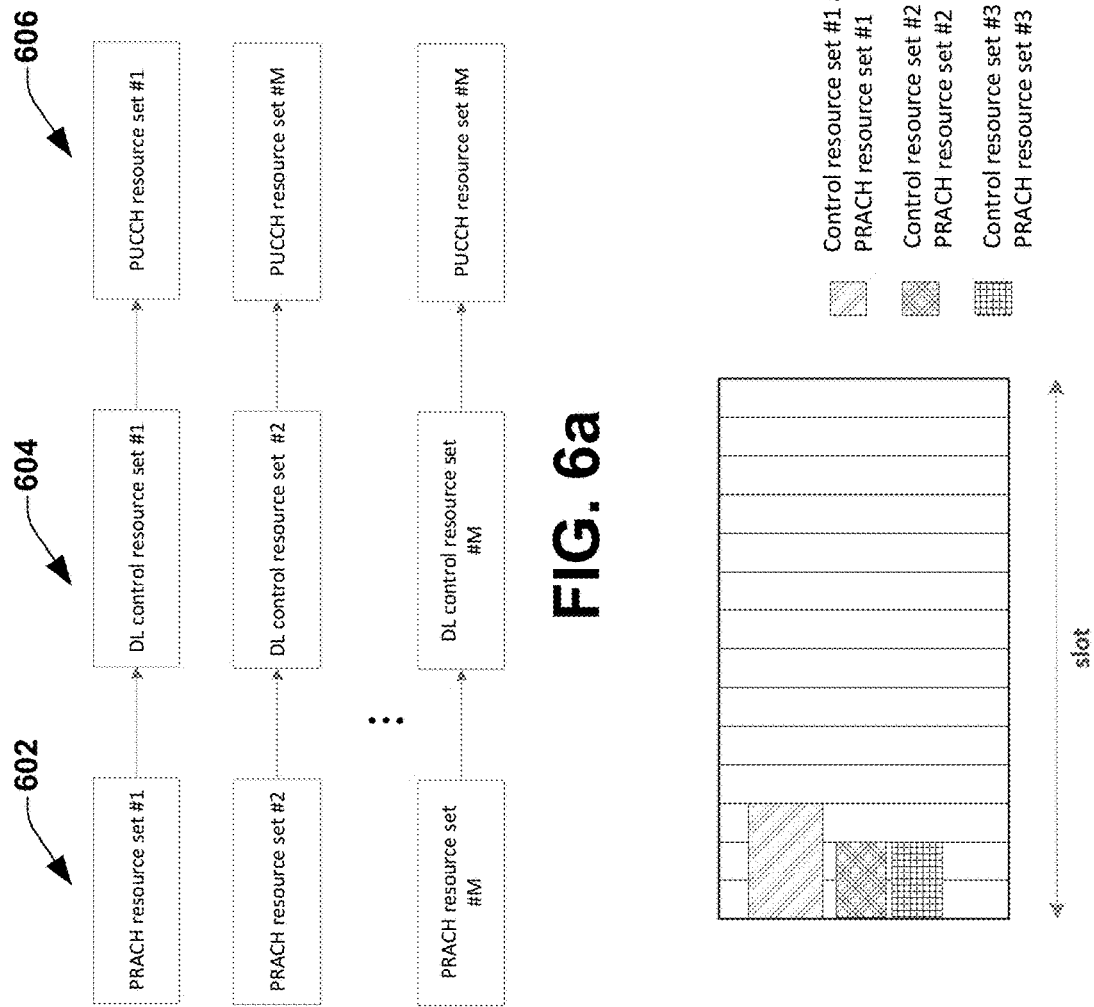
FIG. 6a illustrates an example implementation of a one-to-one association between PRACH resource sets, DL control resource sets and NR PUCCH resource sets, according to one embodiment of the disclosure.
FIG. 6b illustrates an example implementation of multiple DL control resource sets within one slot, according to one embodiment of the disclosure.

FIG. 6a illustrates an example implementation of a one-to-one association between PRACH resource sets, DL control resource sets and NR PUCCH resource sets, according to one embodiment of the disclosure. In FIG. 6a, the predefined resource set association is defined between M sets of PRACH resource sets, DL control resource sets and NR PUCCH resource sets. However, in other embodiments, the predefined resource set association can be defined between any number of sets of PRACH resource sets, DL control resource sets and NR PUCCH resource sets. Further, in some embodiments, one-to-many association may be defined between the different resource sets. For example, in one embodiment, one PRACH resource set may be associated with multiple DL control resource sets.

Figure 5:
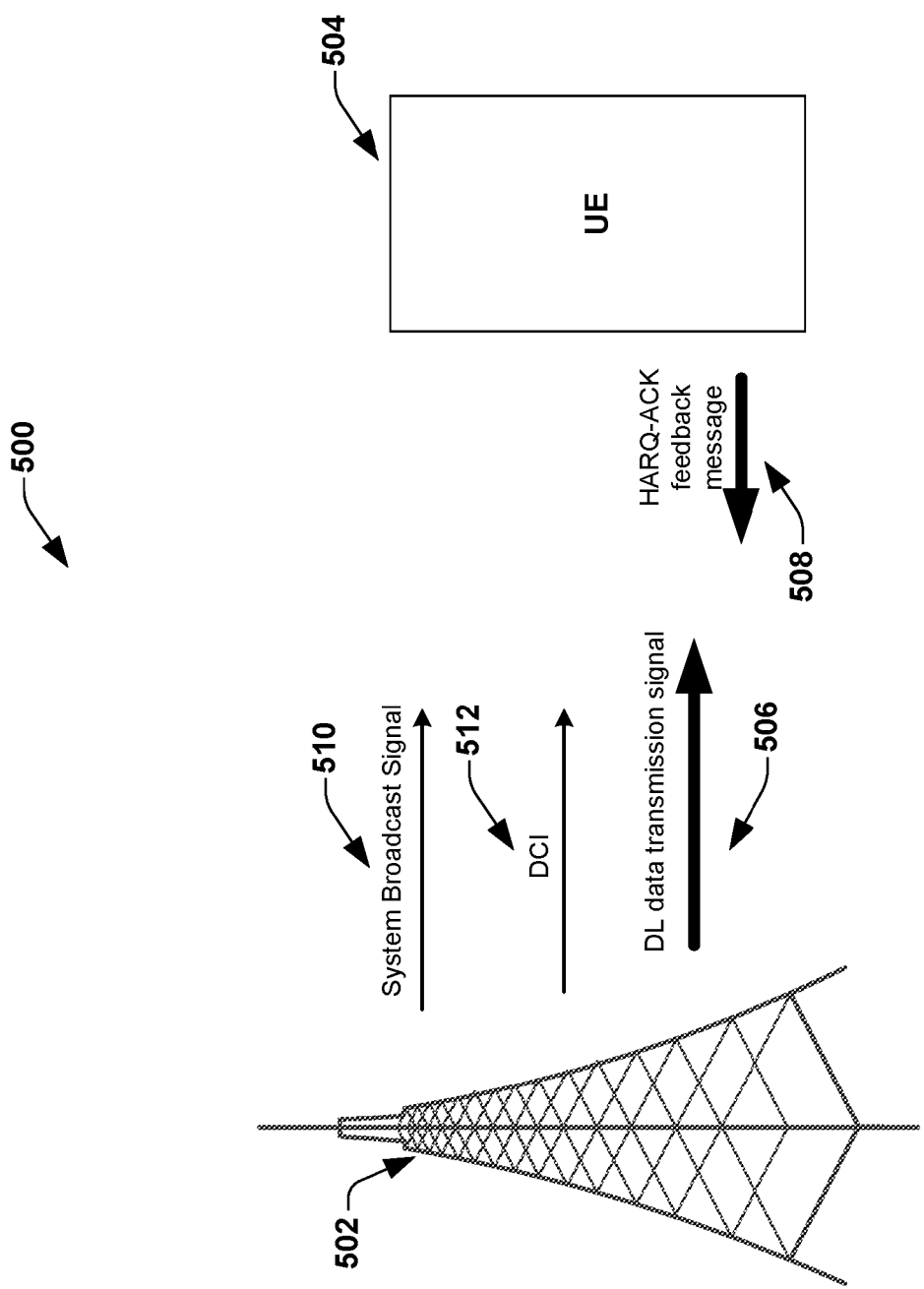
FIG. 5 illustrates an example implementation of an NR communication system that utilizes a predefined resource set association to determine a HARQ-PUCCH resource, according to one embodiment of the disclosure.

FIG. 5 illustrates an example implementation of an NR communication system 500 that utilizes the predefined resource set association in order to determine the HARQ-PUCCH resource, according to one embodiment of the disclosure. In some embodiments, the NR communication system 500 depicts another possible way of implementation of the NR communication system 100 in FIG. 1. The NR communication system 500 comprises a gNodeB 502 and a UE 504. The gNodeB 502 is configured to provide a DL data transmission signal 506 to the UE 504. In some embodiments, the UE 504 is further configured to generate a HARQ-ACK feedback message 508 to be provided to the gNodeB 502, in response to receiving the DL data transmission signal 506 from the gNodeB 502. In some embodiments, the UE 504 is further configured to determine the HARQ-PUCCH resource based on the predefined resource set association as indicated above. In some embodiments, the DL data transmission signal 506 is same as the DL data transmission signal 106 in FIG. 1 and the HARQ-ACK feedback message 508 is same as the HARQ-ACK feedback message 108 in FIG. 1.

In some embodiments, the various resource sets, that is the PRACH resource sets, DL control resource sets and NR PUCCH resource sets are determined/configured at the gNodeB 502. In such embodiments, the gNodeB 502 is configured to configure/determine the different resource sets in time, frequency and/or code domain. In some embodiments, configuring the various resource sets include configuring starting frequency or time location, for example, starting physical resource block (PRB) index associated with the resource sets. In some embodiments, the different PRACH resource sets may be multiplexed in a time division multiplexing (TDM), frequency division multiplexing (FDM) and/or code division multiplexing (CDM) manner or a combination thereof.

In one option, one or a plurality of signature sequences can be reserved for one PRACH resource set. In another option, one or a plurality of frequency resources can be allocated for one PRACH resource set. In another option, one or a plurality of time resources can be allocated for one PRACH resource set. For instance, PRACH for one PRACH resource set can be transmitted in one or a multiple of slots 0, 2, 4, 6, 8 within one frame while PRACH for another PRACH resource set can be transmitted in one or a multiple of slots 1, 3, 5, 7, 9. Yet in another option, a combination of TDM and/or FDM and/or CDM based multiplexed schemes can be used to separate the resource for multiple PRACH resource sets. Further, in some embodiments, multiple DL control resource sets respectively associated with multiple PRACH resource sets may be configured to be within one slot as shown in FIG. 6b. Further, in some embodiments, the multiple DL control resource sets may be overlapped in the time and frequency domain. Further, in some embodiments, different DL control resource sets may be configured in same or different sub bands. The latter case (i.e., the case with different sub bands) may be targeted for wide bandwidth support, where multiple sub-bands can be defined within one wide system bandwidth. In this case, UE may monitor the DL control channel in different sub-bands.

In some embodiments, the gNodeB 502 is further configured to generate the resource set association between the various resource sets. In some embodiments, the gNodeB 502 may be configured to generate the resource set association between different sets of PRACH resource sets, DL control resource sets and NR PUCCH resource sets. However, in other embodiments, the gNodeB 502 may be configured to generate the resource set association between different sets of DL control resource sets and NR PUCCH resource sets only. Upon generating the resource set association, the gNodeB 502 is further configured to provide information on the generated resource sets and the resource set association to the UE 504. In some embodiments, the gNodeB 502 is configured to provide information on the determined resource sets and the resource set association to the UE 504, through higher level signaling, for example, as part of the system broadcast signal 510. In some embodiments the system broadcast signal 510 comprises a NR minimum system information (MSI) or remaining minimum system information (RMSI) or other system information (OSI) or other broadcast signals defined for NR communication systems or a combination thereof. However, in other embodiments, the gNodeB 502 may be configured to provide information on the determined resource sets and the resource set association to the UE 504, differently than above (e.g., using other signals, for example, RRC signals).

In some embodiments, the UE 504 is configured to receive and process the system broadcast signal 510 comprising information on the resource sets and the resource set association, in order to receive the information on the resource sets and the resource set association to be utilized to determine the HARQ-PUCCH resource for the transmission of the HARQ-ACK feedback message 508. However, in other embodiments, the UE 504 may be configured to receive the information on the resource sets and the resource set association differently than above (e.g., preconfigured and stored in memory or via other signals). In one example embodiment, once the information on the resource sets and the resource set association is available at the UE 504, in order to determine the HARQ-PUCCH resource, the UE 504 is configured to determine a PRACH resource set (e.g., the PRACH resource set 602 in FIG. 6a) associated with the UE 504, based on a PRACH resource selected by the UE 504 for a transmission of a PRACH preamble. Once the PRACH resource set is determined, the UE 504 is further configured determine a corresponding DL control resource set (e.g., the DL control resource set 604 in FIG. 6a) based on the predefined resource set association.

Once the DL control resource set is determined, the UE 504 is further configured to monitor the NR PDCCH resources associated with the DL control resource set and process a downlink control information (DCI) 512 associated with the DL control resource set, in order to determine the HARQ-PUCCH resource within a corresponding NR PUCCH resource set (e.g., the NR PUCCH resource set 606 in FIG. 6a). In some embodiments, the DCI 512 associated with the DL control resource set comprises information on the HARQ-PUCCH resource within the corresponding NR PUCCH resource set. In some embodiments, the UE 504 is configured to determine the corresponding NR PUCCH resource set comprising the HARQ-PUCCH resource based on the predefined resource set association.

In some embodiments, when there is a one-to-many association between the PRACH resource set and the DL control resource set (i.e., the PRACH resource set is associated with a plurality of DL control resource sets), the UE 504 is configured to monitor the NR PDCCH resources within these multiple DL control resource sets for the DL data transmission signal 506 and process the DCI 512 associated therewith, in order to determine the HARQ-PUCCH resource. Alternately, in some embodiments, even when there is a one-to-many association between the PRACH resource set and the DL control resource set, the UE 504 may be configured to implicitly select one or a select number of DL control resource sets from the plurality of DL control resource sets for monitoring. In some embodiments, the UE 504 may select one or a select number of DL control resource sets from the plurality of DL control resource sets based on the transmitted preamble index or any other equivalent reference of the transmitted preamble with respect to the PRACH resource set, time and/or frequency location of the preamble within the PRACH resource set.

In such embodiments, the gNodeB 502 is further configured to generate the DCI 512 comprising information on the HARQ-PUCCH resource within the NR PUCCH resource set. For example, in some embodiments, the HARQ-PUCCH resource within the NR PUCCH resource set is implicitly indicated in the DCI 512 as indicated in Table 1 below. More specifically, the NR PUCCH resource allocation field in the DCI 512 can be used to determine the NR PUCCH resource value (i.e., the HARQ-PUCCH resource) from one of four NR PUCCH resource values within one NR PUCCH resource set configured by higher layers according to the mapping defined in Table 1.

TABLE 1

PUCCH resource value for NR PUCCH resource allocation

| Bit field in DCI for NR PUCCH resource allocation | $n_{xPUCCH}^{(p)}$ |
|---|---|
| '00' | The 1$^{st}$ NR PUCCH resource value within one NR PUCCH resource set configured by the higher layers |
| '01' | The 2$^{nd}$ NR PUCCH resource value within one NR PUCCH resource set configured by the higher layers |

TABLE 1-continued

PUCCH resource value for NR PUCCH resource allocation

| Bit field in DCI for NR PUCCH resource allocation $n_{xPUCCH}^{(p)}$ | |
|---|---|
| '10' | The $3^{rd}$ NR PUCCH resource value within one NR PUCCH resource set configured by the higher layers |
| '11' | The $4^{th}$ NR PUCCH resource value within one NR PUCCH resource set configured by the higher layers |

In another example embodiment, if the predefined resource set association comprises an association between different sets of DL control resource sets and NR PUCCH resource sets only, the UE 504 is configured to determine a DL control resource set associated with the UE 504 based on monitoring a DCI 512 associated with the DL data transmission signal 506. In some embodiments, the DCI is associated with the NR PDCCH resources of the preconfigured DL control resource set. Upon determining the DL control resource set, the UE 504 is further configured to process the DCI 512, in order to determine the HARQ-PUCCH resource. In some embodiments, the DCI 512 comprises information on the HARQ-PUCCH resource within a corresponding NR PUCCH resource set. In some embodiments, the UE is further configured to determine the corresponding NR PUCCH resource set based on the predefined resource set association.

Referring to FIG. 1 again, in some embodiments, the UE 104 is configured to determine the HARQ-PUCCH resource as a predefined function of at least one or more HARQ determination parameters. In some embodiments, the HARQ determination parameters comprises:

Control channel element (CCE) index. In one example, the CCE index comprises the lowest CCE index used for transmission of the corresponding NR PDCCH to schedule the corresponding NR PDSCH transmission.

Demodulation Reference Signal (DM-RS) index or antenna port index used for the corresponding NR PDSCH transmission.

Physical resource block (PRB) index for the corresponding NR PDSCH or NR PDCCH transmission. In one example, it can be lowest PRB index for the corresponding NR PDSCH or NR PDCCH transmission;

Physical cell identity (ID) or virtual cell ID. In some embodiments, virtual cell ID can be provided by higher layers via a NR minimum system information (MSI), remaining minimum system information (RMSI), other system information (OSI) or dedicated RRC signalling.

Cell specific parameter(s). The parameter(s) can be signaled by higher layers via NR MSI, RMSI, OSI or dedicated RRC/MAC CE signalling.

DL control resource set index (e.g. in case when multiple DL control resource sets are configured and there is one-to-one or one-to-many association between PRACH resource set and DL control resource set as mentioned above)

Control resource set specific resource offset

Sub-band index

Bandwidth part (BWP) index or BWP specific resource offset. Note that this may be beneficial in case when multiple BWPs are active for a given UE in a given time instance.

UE's Cell Radio Network Temporary Identifier (C-RNTI).

Random access Radio Network Temporary Identifier (RA-RNTI) and/or preamble index for the PRACH in the first step in RACH procedure.

Combination of CCE index and PRACH preamble index, which may be useful in cases that the number of CCEs is less than the available NR PUCCH resources.

In one example embodiment, the UE 104 is configured to determine the HARQ-PUCCH resource as a function of lowest CCE index for the NR PDCCH transmission, at least one configured parameter and control resource set index, as given below:

$$n_{PUCCH}=f(n_{CCE},I_{CORESET},D_{PUCCH}) \quad (1)$$

Where $n_{PUCCH}$ is the HARQ-PUCCH resource, $n_{CCE}$ and $I_{CORESET}$ are the lowest CCE index and control resource set index for the NR PDCCH transmission, respectively and $D_{PUCCH}$ is a configured parameter, which can be cell specific or UE group specific. In some embodiments, the function in equation (1) can be implemented as given below:

$$n_{PUCCH}=c_0 \cdot n_{CCE}+c_1 \cdot I_{CORESET}+c_2 \cdot D_{PUCCH} \quad (2)$$

Where $c_0, c_1, c_2$ are constants, which can be predefined in the specification or configured by higher layers via NR MSI, RMSI, OSI or RRC signaling (i.e., provided by the gNodeB 102). In some embodiments, when there is one-to-one association between PRACH resource set and DL control resource set, UE may determine the DL control resource set index based on the PRACH resource it selects in the first step of RACH procedure. In some embodiments, the configured parameter $D_{PUCCH}$ is provided by the gNodeB 102.

In another example embodiment, the UE 104 is configured to determine the HARQ-PUCCH resource as a function of lowest CCE index for the NR PDCCH transmission, at least one configured parameter and control resource set specific offset as given below:

$$n_{PUCCH}=f(n_{CCE},n_{PUCCH}^{iCORESET},D_{PUCCH}) \quad (3)$$

Where $n_{PUCCH}$ is the HARQ-PUCCH resource, $n_{CCE}$ is the lowest CCE index, $n_{PUCCH}^{iCORESET}$ is the NR PUCCH resource offset for $i_{CORESET}$ DL control resource set and $D_{PUCCH}$ is a configured parameter, which can be cell specific or UE group specific. In some embodiments, the function in equation (3) can be implemented as given below:

$$n_{PUCCH}=c_0 \cdot n_{CCE} c_1 \cdot n_{PUCCH}^{iCORESET}+c_2 \cdot D_{PUCCH} \quad (4)$$

Where $c_0, c_1, c_2$ are constants, which can be predefined in the specification or configured by higher layers via NR MIB, NR SIB or RRC signaling. In some embodiments, the NR PUCCH resource offset for each DL control resource set is predefined by the specification or configured by higher layers via NR MIB or NR SIB (i.e., provided by the gNodeB 102).

In some embodiments, when multiple common or UE group DL control resource sets are configured by gNodeB (e.g., the gNodeB 102), gNodeB 102 may configure one virtual cell ID for each common or UE group DL control resource set for the generation of scrambling seeds and DM-RS sequence for PDCCH and/or scheduling PDSCH/PUSCH transmission. Alternatively, cell ID used for the generation of scrambling seeds and DM-RS sequence PDCCH and/or scheduling PDSCH/PUSCH transmission can be physical cell ID which can be derived at the UE 104 from synchronization signal or indicated in the NR MSI or a combination thereof. This can be applied for the case for the RMSI and OSI transmission. Further, for UE specific DL control resource set, virtual cell ID can be configured by higher layers via RRC signalling.

Figure 7:
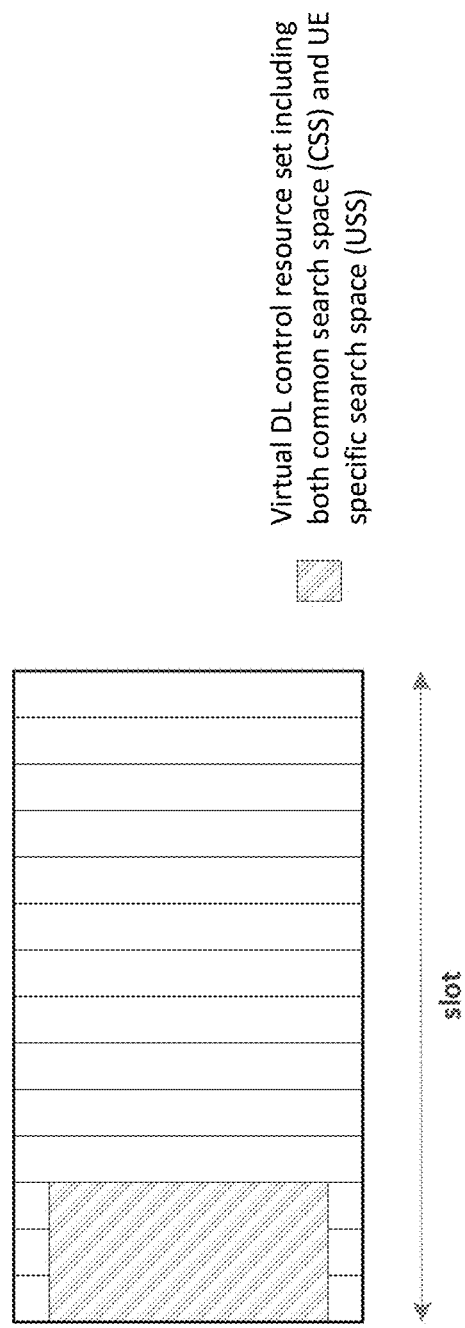
FIG. 7 illustrates a virtual DL control resource set comprising a UE-group or common search space and a UE specific search space, according to one embodiment of the disclosure.

Referring to FIG. 1 again, in some embodiments, the UE 104 is configured to determine the HARQ-PUCCH resource, at least partly, based on a predefined resource set association associated with a predetermined resource set comprising a virtual DL control resource set associated with the NR communication system 100. In particular, in this embodiment, the predefined resource set association comprises a resource set association between a temporary cell radio network temporary identifier (TC-RNTI) or Cell Radio Network Temporary Identifier (C-RNTI), and the virtual DL control resource set. In some embodiments, the virtual DL control resource set comprises UE-group or common search space and UE specific search space as shown in FIG. 7. In particular, in some embodiments, the UE specific search space prior to RRC Connection Setup message can be based on Temporary Cell Radio Network Temporary Identifier (TC-RNTI) or Cell Radio Network Temporary Identifier (C-RNTI). In some embodiments, virtual DL control resource set is configured by the gNodeB 102 and the information on the virtual DL control resource set is provided by the gNodeB 102 to the UE 104 by higher layers (e.g., NR MSI, OSI, RMSI etc.). In some embodiments, the virtual DL control resource set can be further updated by the gNodeB 102 after RRC reconfiguration. In one example, after RRC reconfiguration, there is one to one mapping between DL control resource set and DL control search space. In such embodiments, the UE 102 may be configured to only monitor the UE-group or common search space in one DL control resource set and UE specific search space in another DL control resource set.

In some embodiments, the gNodeB 102 is further configured to determine the predefined resource set association and provide information on the predefined resource set association via a system broadcast signal (not shown) comprising RMSI, NR MSI, NR OSI etc. to the UE 104. In such embodiments, once the information on the predefined resource set association is available to the UE 104, the UE 104 is configured to monitor a random access response (RAR) message associated with the RACH procedure, in order to identify the TC-RNTI or C-RNTI associated with the UE 104. Once the TC-RNTI or C-RNTI is identified, the UE 104 is configured to determine virtual DL control resource set, based on the predefined resource set association. Upon determining the virtual DL control resource set, the UE is configured to monitor the DL control channel associated with the virtual DL control resource set, in order to determine the HARQ-PUCCH resource. In one example embodiment, the UE 104 is configured to determine a CCE index associated with the determined virtual DL control resource set, in order to determine the HARQ-PUCCH resource. For example, in some embodiments, the HARQ-PUCCH resource is determined as given below:

$$n_{PUCCH} = f(n_{CCE}, D_{PUCCH}) \quad (5)$$

Where $n_{PUCCH}$ is the HARQ-PUCCH resource, $n_{CCE}$ is the lowest CCE index and $D_{PUCCH}$ is a configured parameter Referring to FIG. 1 again, in some embodiments, the UE 104 is configured to determine the HARQ-PUCCH resource, at least partly, based on a configuration information comprising a HARQ-ACK resource offset. In some embodiments, the UE 104 is configured to receive information on the HARQ-ACK resource offset based on processing a downlink control information (DCI) associated with the scheduling of the DL data transmission signal 106. In such embodiments, the gNodeB 102 is configured to generate the HARQ-ACK resource offset and provide the information on the HARQ-ACK resource offset to the UE 104 as part of the DCI scheduling the DL data transmission signal 106. Table 2 below illustrates one example of providing information on the HARQ-ACK resource offset via DCI.

TABLE 1

| HARQ-ACK resource offset in the DCI scheduling Msg. 4 transmission | |
|---|---|
| HARQ-ACK resource offset field in DCI scheduling Msg. 4 transmission | $\Delta_{ARO}$ |
| 0 | 0 |
| 1 | −1 |
| 2 | −2 |
| 3 | 2 |

Upon receiving information on the HARQ-ACK resource offset, the UE 104 is configured to determine the HARQ-PUCCH resource as a predefined function of the HARQ-ACK resource offset and the lowest CCE index for the PDCCH for scheduling the transmission of the DL data transmission signal 106 in one example embodiment. In another example embodiment, upon receiving information on the HARQ-ACK resource offset, the UE may be configured to determine the HARQ-PUCCH resource as a predefined function of the HARQ-ACK resource offset and one or more other values which are dynamically indicated in the DCI. However, in other embodiments, the UE 104 may be configured to determine the HARQ-PUCCH resource differently than above, based on the HARQ-ACK resource offset.

Referring to FIG. 1 again, in some embodiments, during RRC reconfiguration, the UE 104 is configured to receive and process an RRC reconfiguration message (not shown) from the gNodeB 102. Upon RRC reconfiguration, a set of NR PUCCH resources can be updated. To ensure proper alignment between gNodeB 102 and UE 104, a certain predefined timing gap, for example, N slots, may be defined on when the new set of NR PUCCH resources take into effect. Therefore, in some embodiments, for the predefined timing gap after receiving a radio resource control (RRC) reconfiguration message from the gNodeB 102, the UE 104 is configured to utilize an old HARQ-PUCCH resource comprising a HARQ-PUCCH resource determined at the UE, prior to receiving the RRC reconfiguration message, in order to generate a transmission of a HARQ-ACK feedback message. Alternately, in some embodiments, for the predefined timing gap after receiving a radio resource control (RRC) reconfiguration message from the gNodeB 102, the UE 104 is configured to use a HARQ-PUCCH resource configured by a system broadcast signal (e.g., NR MSI, NR OSI, RMSI etc.). Further, in some embodiments, for the predefined timing gap after receiving a radio resource control (RRC) reconfiguration message from the gNodeB 102, the UE 104 is configured to use a HARQ-PUCCH resource implicitly derived at the UE 104.

After the predefined timing gap after receiving the RRC reconfiguration message at the UE 104, in some embodiments, the UE 104 is configured to determine a new HARQ-PUCCH resource for the transmission of the HARQ-ACK feedback message, from a set of NR PUCCH resources configured in the RRC reconfiguration message. In some embodiments, the UE 104 is further configured to processing a downlink control information (DCI) associated with a corresponding DL data transmission signal (or the RRC reconfiguration message), in order to determine the new HARQ-PUCCH resource. In some embodiments, one field in the DCI may indicate a select resource from the set of NR PUCCH resources that is to be utilized as the HARQ-PUCCH resource. In some embodiments, the predefined timing gap, or N slots are predefined in the specification or configured by higher layers via NR MIB, NR SIB or RRC signaling.

Figure 8:
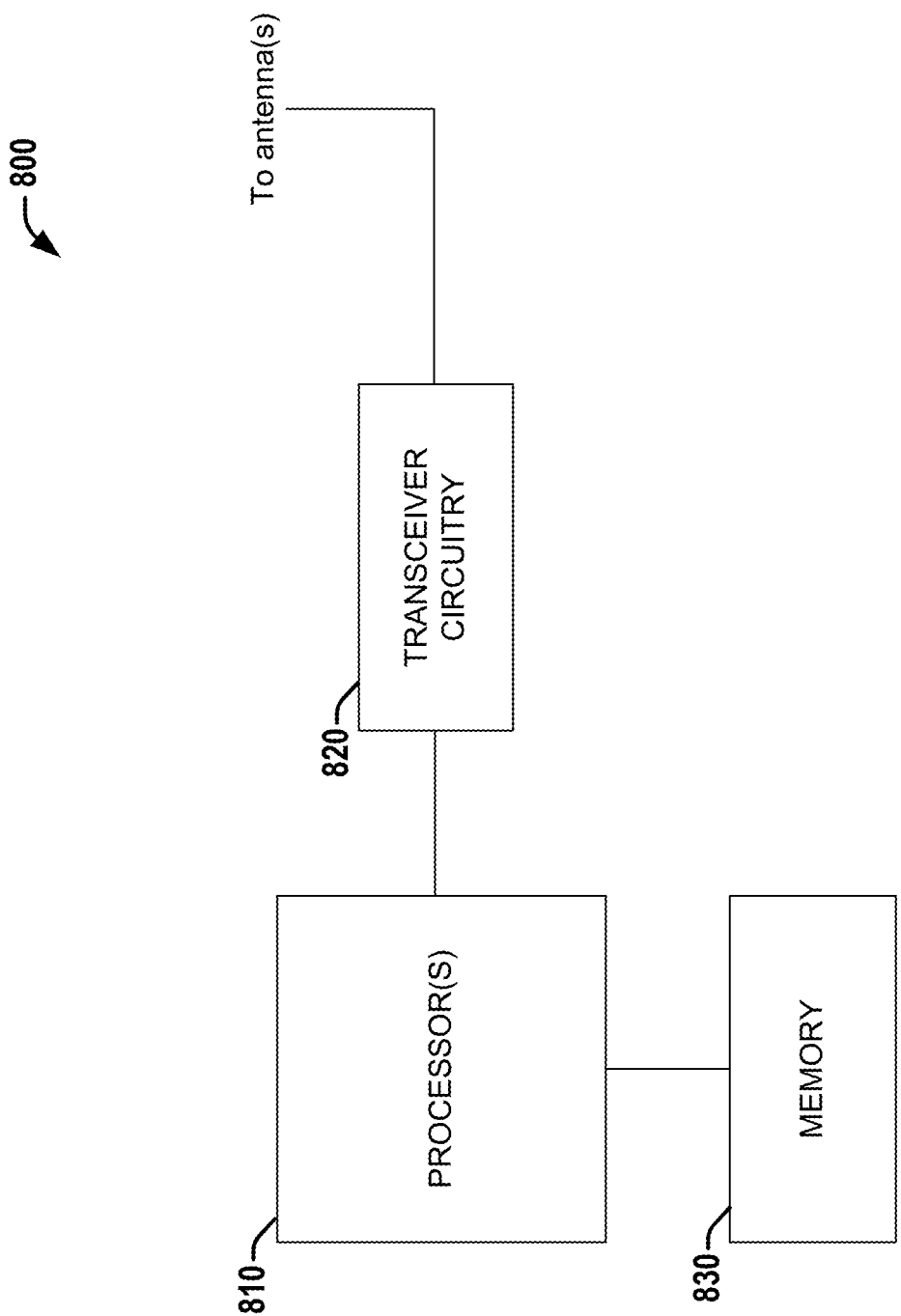
FIG. 8 illustrates a block diagram of an apparatus employable at a UE or other network device that facilitates determining an NR-physical uplink control channel (PUCCH) resource to be utilized for a transmission of a hybrid automatic repeat request (HARQ)-acknowledge (ACK) feedback message to a gNodeB, according to various aspects described herein.

Referring to FIG. 8, illustrated is a block diagram of an apparatus 800 employable at a UE or other network device (e.g., IoT device) that facilitates determining an NR-physical uplink control channel (PUCCH) resource to be utilized for a transmission of a hybrid automatic repeat request (HARQ)-acknowledge (ACK) feedback message to a gNodeB, according to various aspects described herein. Apparatus 800 can include one or more processors 810 (e.g., one or more baseband processors such as one or more of the baseband processors discussed in connection with FIG. 13 and/or FIG. 14) comprising processing circuitry and associated interface(s) (e.g., one or more interface(s) discussed in connection with FIG. 14), transceiver circuitry 820 (e.g., comprising part or all of RF circuitry 1306 in FIG. 13, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 830 (which can comprise any of a variety of storage mediums and can store instructions and/or data associated with one or more of processor(s) 810 or transceiver circuitry 820). In various aspects, apparatus 800 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 810) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410) can comprise one or more of: identifying physical resources associated with the signal/message, detecting the signal/message, resource element group deinterleaving, demodulation, descrambling, and/or decoding.

Figure 4:
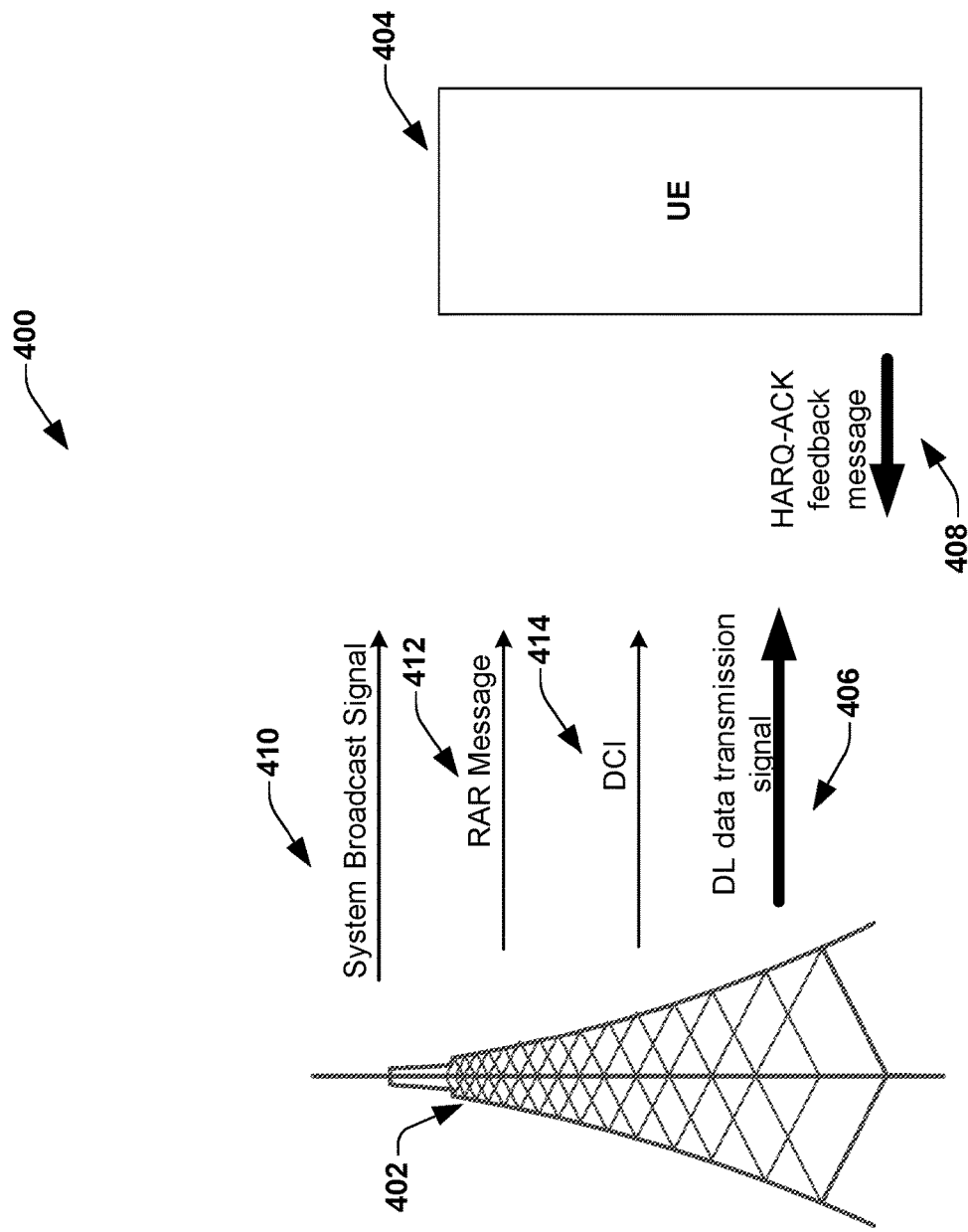
FIG. 4 illustrates an example implementation of an NR communication system that utilizes hybrid automatic repeat request (HARQ)-PUCCH resource configuration information that defines an NR PUCCH resource to be utilized for a transmission of HARQ-ACK feedback, according to one embodiment of the disclosure.

In some embodiments, the apparatus 800 could be included within the UE 104 of FIG. 1, or the UE 404 of FIG. 4 or the UE 504 of FIG. 5. Therefore, the apparatus 800 is described herein with respect to the UE 104 of FIG. 1, the UE 404 of FIG. 4 and the UE 504 of FIG. 5, to cover the various aspects of the disclosure. However, in other embodiments, the apparatus 800 could be included within any UE associated with a new radio (NR) system. In some embodiments, the processing circuit 810 is configured to process a downlink (DL) data transmission signal comprising data (e.g., the DL data transmission signal 106 in FIG. 1) received from a gNodeB associated therewith (e.g., the gNodeB 102 in FIG. 1). Upon processing the DL data transmission signal, the processing circuit 810 is configured to generate a hybrid automatic repeat request (HARQ)-acknowledge (ACK) feedback message (e.g., the HARQ-ACK feedback message 108 in FIG. 1) to be provided to the gNodeB. In some embodiments, the HARQ-ACK feedback message comprises a feedback message generated at the UE, in response to processing a downlink (DL) data transmission signal comprising data received from the gNodeB. In some embodiments, the processing circuit 810 is further configured to generate a transmission of the HARQ-ACK feedback message to the gNodeB. In some embodiments, generating a transmission of the HARQ-ACK feedback message comprises mapping the generated HARQ-ACK feedback message to an allocated resource, for subsequent transmission of the HARQ-ACK feedback message to the gNodeB.

However, as indicated above with respect to FIG. 1, in some embodiments, a new radio (NR) physical uplink control channel (PUCCH) resource to be utilized by the UE, in order to generate the transmission of the HARQ-ACK feedback message to the gNodeB is not available at the UE (e.g., the UE 104 in FIG. 1). For example, in some embodiments, when the DL data transmission signal is received at the UE prior to an establishment of a radio resource control connection establishment between the UE and the gNodeB, UE specific resources are not defined for the UE, and therefore, in such embodiments, the UE may not have information on the NR PUCCH resource to be utilized for the transmission of the HARQ-ACK feedback message. Further, in some embodiments, even if the RRC connection is established between the UE and the gNodeB, the UE may not have information on the NR PUCCH resource to be utilized for the transmission of the HARQ-ACK feedback message.

In such embodiments, the processing circuit 810 is further configured to determine an NR PUCCH resource, comprising a HARQ-PUCCH resource, to be utilized for a transmission of a HARQ-ACK feedback message to the gNodeB. Upon determining the HARQ-PUCCH resource, the processing circuit 810 is further configured to generate the transmission of the HARQ-ACK feedback message using the determined HARQ-PUCCH resource. Once the transmission of the HARQ-ACK feedback message is generated at the processing circuit 810, the processing circuit 810 is further configured to provide the generated transmission of the HARQ-ACK feedback message, via one or more interfaces (e.g., radio frequency (RF) interfaces) associated therewith, to the transceiver circuitry 820, for subsequent transmission to the gNodeB.

In a first embodiment, the processing circuit 810 is configured to determine the HARQ-PUCCH resource based on processing a configuration information comprising a HARQ-PUCCH resource configuration information received from a gNodeB (as explained above with respect to FIG. 4). For the ease of explanation, the apparatus 800 is assumed to be included within the UE 404 of FIG. 4 in this embodiment. In some embodiments, the HARQ-PUCCH resource configuration information comprises a set of HARQ-PUCCH resource configuration parameters that define the HARQ-PUCCH resource as explained above. In some embodiments, the processing circuit 810 is configured to determine the HARQ-PUCCH resource, at least partly, based on processing a random access response (RAR) message (e.g., the RAR message 412 in FIG. 4) associated with a RACH procedure received from the gNodeB (e.g., the gNodeB 404 in FIG. 4), via the transceiver circuitry 820, in accordance with the instructions stored in the memory circuit 830. In some embodiments, the RAR message comprises one or more HARQ-PUCCH resource configuration parameters associated with the HARQ-PUCCH resource configuration information. In some embodiments, in addition to the RAR message, the processing circuit 810 is further configured to process a downlink control information (DCI) associated with the DL data transmission signal (e.g., the DL data transmission signal 406) received from the gNodeB, via the transceiver circuitry 820, in order to determine the HARQ-PUCCH resource. In some embodiments, the DCI comprises one or more HARQ-PUCCH resource configuration parameters associated with the HARQ-PUCCH resource configuration information.

Alternately, in some embodiments, the processing circuit 810 is configured to determine the HARQ-PUCCH resource, at least partly, based on processing a system broadcast signal (e.g., the system broadcast signal 410 in FIG. 4) received from the gNodeB, via the transceiver circuitry 520. In some embodiments, the system broadcast signal comprises one or more HARQ-PUCCH resource configuration parameters associated with the HARQ-PUCCH resource configuration information. In some embodiments, in addition to the system broadcast signal, the processing circuit 810 is further configured to process the random access response (RAR) message associated with a RACH procedure or the downlink control information (DCI) associated with the DL data transmission signal, or both, in order to determine the HARQ-PUCCH resource. In some embodiments, both the RAR message and the DCI comprises one or more HARQ-PUCCH resource configuration parameters associated with the HARQ-PUCCH resource configuration information, in order to determine the HARQ-PUCCH resource.

For example, in some embodiments, the processing circuit 810 is configured to process an RMSI, received from the gNodeB, comprising a set of the HARQ-PUCCH resource configuration parameters, in order to determine the HARQ-PUCCH resource. In some embodiments, the set of the HARQ-PUCCH resource configuration parameters provide information on a set of NR PUCCH resources. Further, the processing circuit 810 is configured to process a DCI comprising one or more HARQ-PUCCH resource configuration parameters that indicate a selected NR PUCCH resource from the set of NR PUCCH resources to be utilized for the transmission of the HARQ-ACK feedback message. However, in other embodiments, the processing circuit 810 may be configured to determine the HARQ-PUCCH resource based on other downlink (DL) signals comprising one or more HARQ-PUCCH resource configuration parameters, different from the signals indicated above.

Alternately or additionally, in some embodiments, the processing circuit 810 is further configured to process a system broadcast signal (e.g., the system broadcast signal 410 in FIG. 4) received from the gNodeB, comprising information on a subband to define NR PUCCH region, in order to determine the HARQ-PUCCH resource. In such embodiments, the processing circuit 810 is configured to determine the HARQ-PUCCH resource for the transmission of HARQ-ACK feedback, within the subband indicated in the system broadcast signal, based on the HARQ-PUCCH resource configuration information received, according to any of the various aspects indicated above.

In a second embodiment, the processing circuit 810 is configured to determine the HARQ-PUCCH resource, at least in part, based on a predefined resource set association between at least two of physical random access channel (PRACH) resource sets, DL control resource sets and NR PUCCH resource sets, as explained above with respect to FIG. 5. For the ease of explanation, the apparatus 800 is assumed to be included within the UE 504 of FIG. 5 in this embodiment. In some embodiments, the processing circuit 810 is configured to process a system broadcast signal (e.g., the system broadcast signal 510 in FIG. 5) from a gNodeB (e.g., the gNodeB 502 in FIG. 5) associated therewith, in order to receive information on the predefined resource set association. In such embodiments, the system broadcast signal comprises information on the predefined resource set association. However, in other embodiments, the information on the predefined resource set association may be received at the processing circuit 810, differently than above. In some embodiments, the processing circuit 810 is further configured to store the information on the predefined resource set association in the memory circuit 830, In some embodiments, the predefined resource set association comprises a one-to-one or one-to-many association between sets of PRACH resource sets, DL control resource sets and NR PUCCH resource sets (e.g., as shown in FIG. 6*a*). However, in other embodiments, the predefined resource set association comprises a one-to-one or one-to-many association between sets of DL control resource sets and NR PUCCH resource sets only. Once the predefined resource set association is available at the processing circuit 810, the processing circuit 810 is configured to determine the HARQ-PUCCH resource based on the predefined resource set association.

For example, in some embodiments, when the predefined resource set association comprises a one-to-one or one-to-many association between sets of PRACH resource sets, DL control resource sets and NR PUCCH resource sets, in order to determine the HARQ-PUCCH resource, the processing circuit 810 is configured to determine a PRACH resource set associated with the UE (e.g., the UE 504), based on a PRACH resource selected by the UE for a transmission of a PRACH preamble. Upon determining the PRACH resource set, the processing circuit 810 is further configured determine a corresponding DL control resource set associated with the UE, based on the predefined resource set association. Upon determining the DL control resource set, the processing circuit 810 is further configured to monitor a DL control channel associated with the DL control resource set and process a downlink control information (DCI) associated with the DL control resource set. In some embodiments, the DCI comprises information on the HARQ-PUCCH resource within a corresponding NR PUCCH resource set. In some embodiments, the processing circuit 810 is further configured to determine the corresponding NR PUCCH resource set comprising the HARQ-PUCCH resource based on the predefined resource set association, in order to determine the HARQ-PUCCH resource.

Alternately, in some embodiments, when the predefined resource set association comprises a one-to-one or one-to-many association between sets of DL control resource sets and NR PUCCH resource sets only, in order to determine the HARQ-PUCCH resource, the processing circuit 810 is configured to determine a DL control resource set, based on a DCI associated with the DL data transmission signal (e.g., the DL data transmission signal 506) received from the gNodeB (e.g., the gNodeB 502). In some embodiments, the DCI is associated with the NR physical downlink control channel (PDCCH) resources associated with the DL control resource set. Upon determining the DL control resource set, the processing circuit 810 is further configured to process the downlink control information (DCI) associated with the DL data transmission signal. In some embodiments, the DCI comprises information on the HARQ-PUCCH resource within a corresponding NR PUCCH resource set associated with the predefined resource set association between the DL control resource set and the NR PUCCH resource set. In some embodiments, the processing circuit 810 is further configured to determine the corresponding NR PUCCH resource set comprising the HARQ-PUCCH resource based on the predefined resource set association, in order to determine the HARQ-PUCCH resource.

In a third embodiment, the processing circuit 810 is configured to determine the HARQ-PUCCH resource as a predefined function of at least one or more HARQ determination parameters (e.g., the predefined functions given in equations (1)-(5) above), as explained above with respect to FIG. 1. For the ease of explanation, the apparatus 800 is assumed to be included within the UE 104 of FIG. 1 in this embodiment. In some embodiments, the HARQ determination parameters comprises a control channel element (CCE) index, a Demodulation Reference Signal (DM-RS) index or antenna port index used for a corresponding NR physical downlink shared channel (PDSCH) transmission, physical resource block (PRB) index for the corresponding NR PDSCH or NR physical downlink control channel (PDCCH) transmission, physical cell identity (ID) or virtual cell ID, control resource set index, control resource set specific resource offset sub-band index, Cell Radio Network Temporary Identifier (C-RNTI), random access radio network temporary Identifier (RA-RNTI) and/or preamble index for the PRACH in the first step in RACH procedure and a combination of CCE index and PRACH preamble index, as explained above. In such embodiments, the processing circuit 810 is configured to implement the predefined functions, in order to determine the HARQ-PUCCH resource. In some embodiments, the processing circuit 810 is further configured to process one or more signals (e.g., a system broadcast signal) from a gNodeB (e.g., the gNodeB 102 in FIG. 1), in order to determine the one or more parameters (e.g., the configured parameter $D_{PUCCH}$ or the constants $c_0$, $c_1$, $c_2$ given in equations (2) and (4)) required to implement the predefined functions.

In a fourth embodiment, the processing circuit 810 is configured to determine the HARQ-PUCCH resource, at least partly, based on a configuration information comprising a HARQ-ACK resource offset received from the gNodeB, as explained above with respect to FIG. 1. For the ease of explanation, the apparatus 800 is assumed to be included within the UE 104 of FIG. 1 in this embodiment. In some embodiments, the processing circuit 810 is configured o process a downlink control information (DCI) associated with a DL data transmission signal (e.g., the DL data transmission signal 106 in FIG. 1) received from the gNodeB (e.g., the gNodeB 102 in FIG. 1), in order to receive information on the HARQ-ACK resource offset. In such embodiments, the DCI scheduling the DL data transmission signal comprises information on the HARQ-ACK resource offset.

Upon receiving information on the HARQ-ACK resource offset, in some embodiments, the processing circuit 810 is configured to determine the HARQ-PUCCH resource as a predefined function of the HARQ-ACK resource offset and the lowest CCE index for the PDCCH for scheduling the transmission of the DL data transmission signal (e.g., the DL transmission signal 106 in FIG. 1) in one example embodiment. In another example embodiment, upon receiving information on the HARQ-ACK resource offset, the processing circuit 810 may be configured to determine the HARQ-PUCCH resource as a predefined function of the HARQ-ACK resource offset and one or more other values which is dynamically indicated in the DCI. However, in other embodiments, the processing circuit 810 may be configured to determine the HARQ-PUCCH resource differently, based on the HARQ-ACK resource offset.

In a fifth embodiment, the processing circuit 810 is configured to determine the HARQ-PUCCH resource, at least partly, based on a predefined resource set association between a temporary cell radio network temporary identifier (TC-RNTI) or Cell Radio Network Temporary Identifier (C-RNTI), and a virtual DL control resource set, as explained above with respect to FIG. 1. For the ease of explanation, the apparatus 800 is assumed to be included within the UE 104 of FIG. 1 in this embodiment. In some embodiments, the processing circuit 810 is configured to receive information on the predefined resource set association from a gNodeB associated therewith (e.g., the gNodeB 102 in FIG. 1). In some embodiments, the processing circuit 810 is configured to process a system broadcast signal (e.g., MSI, RMSI, OSI etc.) from the gNodeB, in order to receive the information on the predefined resource set association. However, in other embodiments, the information on the predefined association may be received at the processing circuit 810 differently (e.g., other signals like RRC signaling or stored in a memory associated therewith).

Once the information on the predefined resource set association is available at the processing circuit 810, the processing circuit 810, in order to determine the HARQ-PUCCH resource, is configured to process a random access response (RAR) message comprising the TC-TNTI or the C-RNTI. Upon determining the TC-TNTI or the C-RNTI, the processing circuit 810 is configured to determine the corresponding virtual DL control resource set based on the predefined resource set association. Once the virtual control resource set is determined, in some embodiments, the processing circuit 810 is further configured to monitor a DL control channel within the virtual DL control resource set, in order to determine the HARQ-PUCCH resource. In one example embodiment, the processing circuit 810 is configured to determine the lowest CCE index for the NR PDCCH transmission based on monitoring the DL control channel within the virtual DL control resource set and determine the HARQ-PUCCH resource as a function of lowest CCE index, and one configured parameter, as given in equation (5) above. However, in other embodiments, the processing circuit 810 may be configured to determine the HARQ-PUCCH resource differently than above, based on the predefined resource set association.

Further, in some embodiments, as explained above with respect to FIG. 1, during RRC reconfiguration, the processing circuit 810 may be configured to receive and process an RRC reconfiguration message from the gNodeB. For the ease of explanation, the apparatus 800 is assumed to be included within the UE 104 of FIG. 1 in this embodiment. Upon receiving the RRC reconfiguration message from the gNodeB (e.g., the gNodeB 102 in FIG. 1), in some embodiments, for the predefined timing gap after receiving the RRC reconfiguration message, the processing circuit 810 is configured to utilize an old HARQ-PUCCH resource comprising a HARQ-PUCCH resource determined at the processing circuit 810, prior to receiving the RRC reconfiguration message, in order to generate a transmission of a HARQ-ACK feedback message. Alternately, in some embodiments, for the predefined timing gap after receiving a radio resource control (RRC) reconfiguration message from the gNodeB, the processing circuit 810 is configured to use a HARQ-PUCCH resource configured by a system broadcast signal (e.g., NR MSI, NR OSI, RMSI etc.) from the gNodeB, in order to generate a transmission of a HARQ-ACK feedback message. Further, in some embodiments, for the predefined timing gap after receiving a radio resource control (RRC) reconfiguration message from the gNodeB, the processing circuit 810 is configured to use a HARQ-PUCCH resource implicitly derived at the processing circuit 810, as disclosed in the various aspects above, in order to generate a transmission of a HARQ-ACK feedback message.

After the predefined timing gap after receiving the RRC reconfiguration message at the processing circuit 810, in some embodiments, the processing circuit 810 is configured to determine a new HARQ-PUCCH resource for the transmission of the HARQ-ACK feedback message, from a set of NR PUCCH resources configured in the RRC reconfiguration message, based on processing the RRC reconfiguration message. In some embodiments, the processing circuit 810 is further configured to process a downlink control information (DCI) associated with a corresponding DL data transmission signal (or the RRC reconfiguration message), in order to determine the new HARQ-PUCCH resource. In some embodiments, one field in the DCI may indicate a select resource from the set of NR PUCCH resources that is to be utilized as the HARQ-PUCCH resource. In some embodiments, the predefined timing gap, or N slots are predefined in the specification or configured by higher layer signaling (e.g., NR MSI, NR OSI, RMSI or RRC signaling) from the gNodeB.

Figure 9:
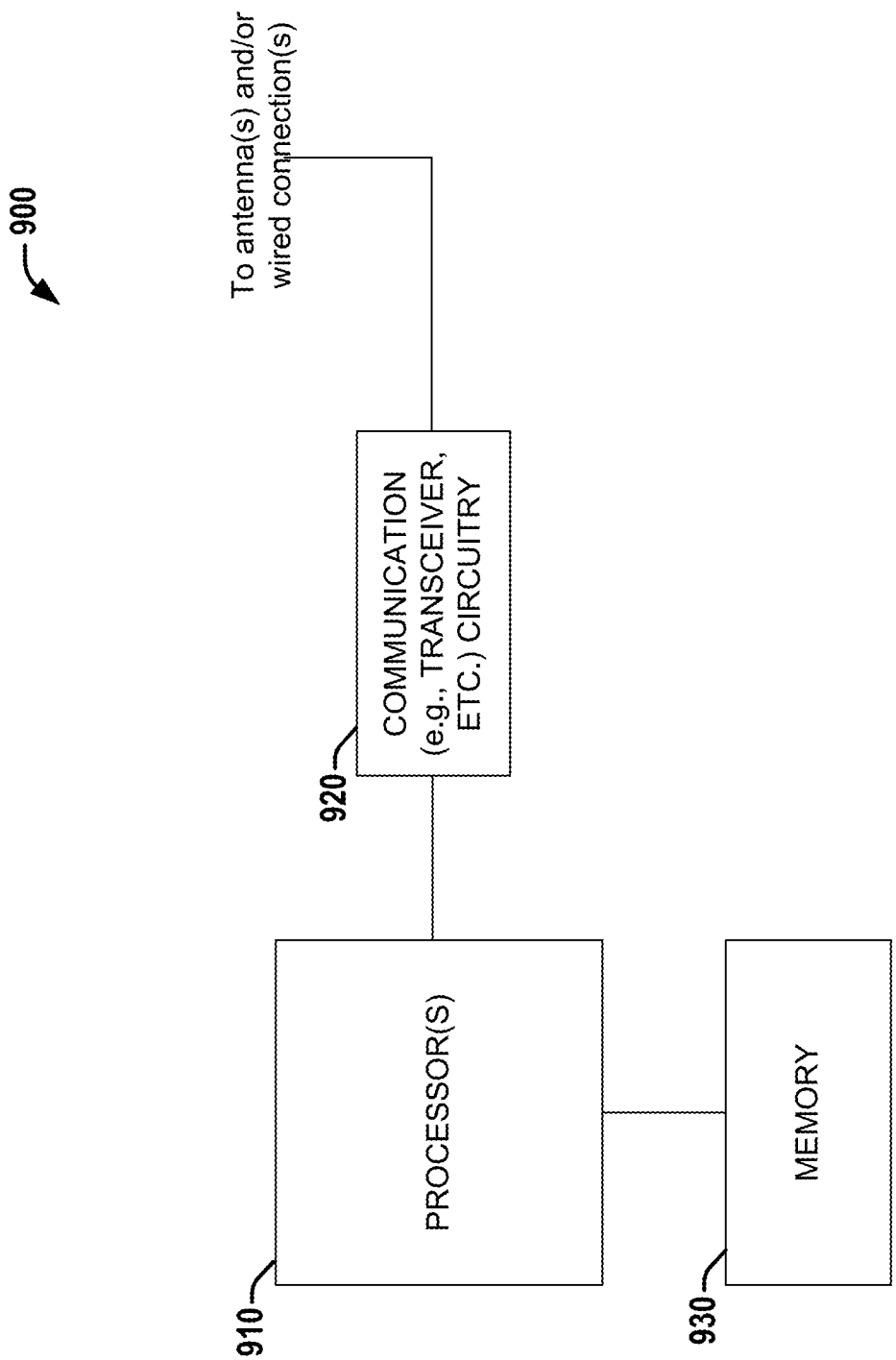
FIG. 9 illustrates a block diagram of a system employable at a Base Station (BS), eNB, gNB or other network device that facilitates a user equipment (UE) associated therewith to determine an NR-physical uplink control channel (PUCCH) resource to be utilized for a transmission of a hybrid automatic repeat request (HARQ)-acknowledge (ACK) feedback message to the gNodeB, according to various aspects described herein.

Referring to FIG. 9, illustrated is a block diagram of a system 900 employable at a Base Station (BS), eNodeB, gNodeB or other network device that can enable a user equipment (UE) associated therewith to determine an NR-physical uplink control channel (PUCCH) resource to be utilized for a transmission of a hybrid automatic repeat request (HARQ)-acknowledge (ACK) feedback message to the gNodeB, according to various aspects described herein. System 900 can include one or more processors 910 (e.g., one or more baseband processors such as one or more of the baseband processors discussed in connection with FIG. 13 and/or FIG. 14) comprising processing circuitry and associated interface(s) (e.g., one or more interface(s) discussed in connection with FIG. 14), communication circuitry 920 (e.g., which can comprise circuitry for one or more wired (e.g., X2, etc.) connections and/or part or all of RF circuitry 1306 in FIG. 3, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 930 (which can comprise any of a variety of storage mediums and can store instructions and/or data associated with one or more of processor(s) 910 or communication circuitry 920). In various aspects, system 900 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 910, communication circuitry 920, and the memory 930 can be included in a single device, while in other aspects, they can be included in different devices, such as part of a distributed architecture.

In some embodiments, the apparatus 900 could be included within the gNodeB 102 of FIG. 1, or the gNodeB 402 of FIG. 4 or the UE 502 of FIG. 5. Therefore, the apparatus 800 is described herein with respect to the gNodeB 102 of FIG. 1, the gNodeB 402 of FIG. 4 and the UE 502 of FIG. 5, to cover the various aspects of the disclosure. However, in other embodiments, the apparatus 900 could be included within any gNodeB associated with a new radio (NR) system. In some embodiments, the processing circuit 910 is configured to generate a DL data transmission signal (e.g., the DL data transmission signal 106 in FIG. 1) comprising data to be provided to a UE (e.g., the UE 104 in FIG. 1) associated therewith. In some embodiments, the DL data transmission signal generated at the processing circuit 910 is provided to the communication circuitry 920, via one or more radio frequency (RF) interfaces associated with the processing circuit 910, for subsequent transmission of the DL data transmission signal to the UE.

In some embodiments, the processing circuit 910 is further configured to process a hybrid automatic repeat request (HARQ)-acknowledge (ACK) feedback message (e.g., the HARQ-ACK feedback message 108 in FIG. 1), received from the UE, in response to providing the DL data transmission signal to the UE. In some embodiments, the HARQ-ACK feedback message is received at the processing circuit 910, from the UE, on an NR physical uplink control channel (PUCCH) resource. In some embodiments, the NR PUCCH resource utilized by the UE, in order to transmit the HARQ-ACK feedback message to the gNodeB is determined at the UE, at least partly, based on information provided by the gNodeB. In some embodiments, the NR PUCCH resource utilized by the UE, in order to transmit the HARQ-ACK feedback message to the gNodeB is referred to as HARQ-PUCCH resource. Therefore, in some embodiments, prior to receiving the HARQ-ACK feedback message from the UE, the processing circuit 910 is configured to provide information on one or more parameters (e.g., configuration information, resource set association etc.) that enable the UE to determine the HARQ-PUCCH resource to be utilized to transmit the HARQ-ACK feedback message to the gNodeB.

In a first embodiment, as explained above with respect to FIG. 4, the processing circuit 910 is configured to determine a configuration information comprising a HARQ-PUCCH resource configuration information comprising a set of HARQ-PUCCH resource configuration parameters that define the HARQ-PUCCH resource (as explained above with respect to FIG. 4), to be provided to the UE (UE 404 in FIG. 4), in order to enable the UE to determine the HARQ-PUCCH resource. For the ease of explanation, the apparatus 900 is assumed to be included within the gNodeB 402 of FIG. 4 in this embodiment. In some embodiments, processing circuit 910 is further configured to generate one or more DL signals comprising one or more HARQ-PUCCH resource configuration parameters of the set of HARQ-PUCCH resource configuration parameters, to be provided to the UE, in order to enable the UE to determine the HARQ-PUCCH resource. In some embodiments, the one or more DL signals generated at the processing circuit 910 is further provided to the communication circuitry 920, via one or more radio frequency (RF) interfaces associated with the processing circuit 910, for subsequent transmission of the one or more DL signals to the UE.

For example, in some embodiments, the processing circuit 910 is configured to generate a random access response (RAR) message (e.g., the RAR message 412 in FIG. 4) comprising one or more HARQ-PUCCH resource configuration parameters associated with the set of HARQ-PUCCH resource configuration parameters, to be provided to the UE, in order to provide at least a first part of the HARQ-PUCCH resource configuration information to the UE. In some embodiments, the RAR message is associated with a random access channel (RACH) procedure. Additionally or alternately, in some embodiments, the processing circuit 910 is further configured to generate a downlink control information (DCI) (e.g., the DCI 414 in FIG. 4) comprising one or more HARQ-PUCCH resource configuration parameters associated with the set of HARQ-PUCCH resource configuration parameters, to be provided to the UE, in order to provide a second, different part of the HARQ-PUCCH resource configuration information to the UE. In some embodiments, the DCI is associated with the DL data transmission signal e.g., the DL data transmission signal 406 in FIG. 4) and further comprises information for scheduling the DL data transmission signal.

Alternately, in some embodiments, the processing circuit 910 is configured to generate a system broadcast signal (e.g., the system broadcast signal 410 in FIG. 4) comprising one or more HARQ-PUCCH resource configuration parameters associated with the set of HARQ-PUCCH resource configuration parameters, to be provided to the UE, in order to provide at least a first part of the HARQ-PUCCH resource configuration information to the UE. In addition, in some embodiments, the processing circuit 910 is further configured to generate a random access response (RAR) message (e.g., the RAR message 412 in FIG. 4) associated with a RACH procedure or a downlink control information (DCI) (e.g., the DCI 414 in FIG. 4) associated with the DL data transmission signal, or both, to be provided to the UE, in order to provide a second, different part of the HARQ-PUCCH resource configuration information to the UE. In some embodiments, both the RAR message and the DCI comprises one or more HARQ-PUCCH resource configuration parameters associated with the set of HARQ-PUCCH resource configuration parameters. However, in other embodiments, the processing circuit 910 may be configured to generate one or more DL signals different from the above, in order to provide the HARQ-PUCCH resource configuration information to the UE.

In a second embodiment, as explained above with respect to FIG. 5, the processing circuit 910 is configured to determine a resource set association between predetermined sets of at least two of physical random access channel (PRACH) resource sets, downlink (DL) control resource sets and NR physical uplink control channel (PUCCH) resource sets, to be provided to the UE (e.g., the UE 504), in order to enable the UE to determine the HARQ-PUCCH resource. For the ease of explanation, the apparatus 900 is assumed to be included within the gNodeB 502 of FIG. 5 in this embodiment. In some embodiments, the resource set association comprises a resource set association between PRACH resource sets, DL control resource sets and NR PUCCH resource sets. However, in other embodiments, the resource set association may comprise a resource set association between DL control resource sets and NR PUCCH resource sets only. Further, in some embodiments, the resource set association may comprise a one-to-one or one-to-many association between the different resource sets, as explained above with respect to FIG. 5.

In some embodiments, the processing circuit 910 is further configured to generate one or more DL signals comprising information on the resource set association, to be provided to the UE, in order to enable the UE to determine the HARQ-PUCCH resource. In some embodiments, the one or more DL signals generated at the processing circuit 910 is further provided to the communication circuitry 920, via one or more radio frequency (RF) interfaces associated with the processing circuit 910, for subsequent transmission of the one or more DL signals to the UE. For example, in some embodiments, the processing circuit 910 is configured to generate a system broadcast signal (e.g., the system broadcast signal 510 in FIG. 5) comprising information on the determined resource set association, to be provided to the UE, in order to provide the information on the determined resource set association to the UE. However, in other embodiments, other signals different from the system broadcast signal may also be utilized to provide the information on the determined resource set association to the UE.

In some embodiments, the processing circuit 910 is further configured to generate a downlink control information (DCI) (e.g., the DCI 512 in FIG. 5) comprising information on the HARQ-PUCCH resource within a NR PUCCH resource set, to be provided to the UE, in order to enable the UE to determine the HARQ-PUCCH resource. In some embodiments, the NR PUCCH resource set comprises an NR PUCCH resource set associated with the resource set association. Further, in some embodiments, the processing circuit 910 is configured to provide the DCI as part of a corresponding DL control resource set associated with the resource set association. In some embodiments, the processing circuit 910 is further configured to configure/generate the various resource sets e.g., the PRACH resource sets, the DL control resource sets and the NR PUCCH resource sets), prior to determining the resource set association.

In a third embodiment, the processing circuit 910 may be configured to determine configuration information comprising one or more parameters, for example, the configured parameter $D_{PUCCH}$, constants $c_0$, $c_1$, $c_2$ etc. explained above with respect to equation (2) above, to be provided to the UE (e.g., the UE 104 in FIG. 1), in order to enable the UE to determine the HARQ-PUCCH resource. In such embodiments, the processing circuit 910 is further configured to generate one or more DL signals, for example, a system broadcast signal, comprising the one or more parameters, to be provided to the UE, in order to provide the one or more parameters to the UE.

In a fourth embodiment, the processing circuit 910 is configured to determine a predefined resource set association between a temporary cell radio network temporary identifier (TC-RNTI) or Cell Radio Network Temporary Identifier (C-RNTI), and a virtual DL control resource set, to be provided to a UE (e.g., the UE 104 in FIG. 1), in order to enable the UE to determine the HARQ-PUCCH resource. In such embodiments, the processing circuit 910 is further configured to generate one or more DL signals, for example, a system broadcast signal, comprising information on the predefined association, to be provided to the UE, in order to provide information on the predefined association to the UE.

Further, in a fifth embodiment, the processing circuit 910 is configured to determine a configuration information comprising a HARQ-ACK resource offset, to be provided to the UE (e.g. the UE 104 in FIG. 1), in order to enable the UE to determine the HARQ-PUCCH resource. In some embodiments, the processing circuit 910 is further configured to generate one or more DL signals, for example, a downlink control information (DCI), comprising the HARQ-ACK resource offset, to be provided to the UE, in order to provide information on the determined HARQ-ACK resource offset to the UE. In some embodiments, the DCI is associated with the DL data transmission signal (e.g., the DL data transmission signal 106 in FIG. 1) and further comprises information for scheduling the DL data transmission signal.

Figure 10:
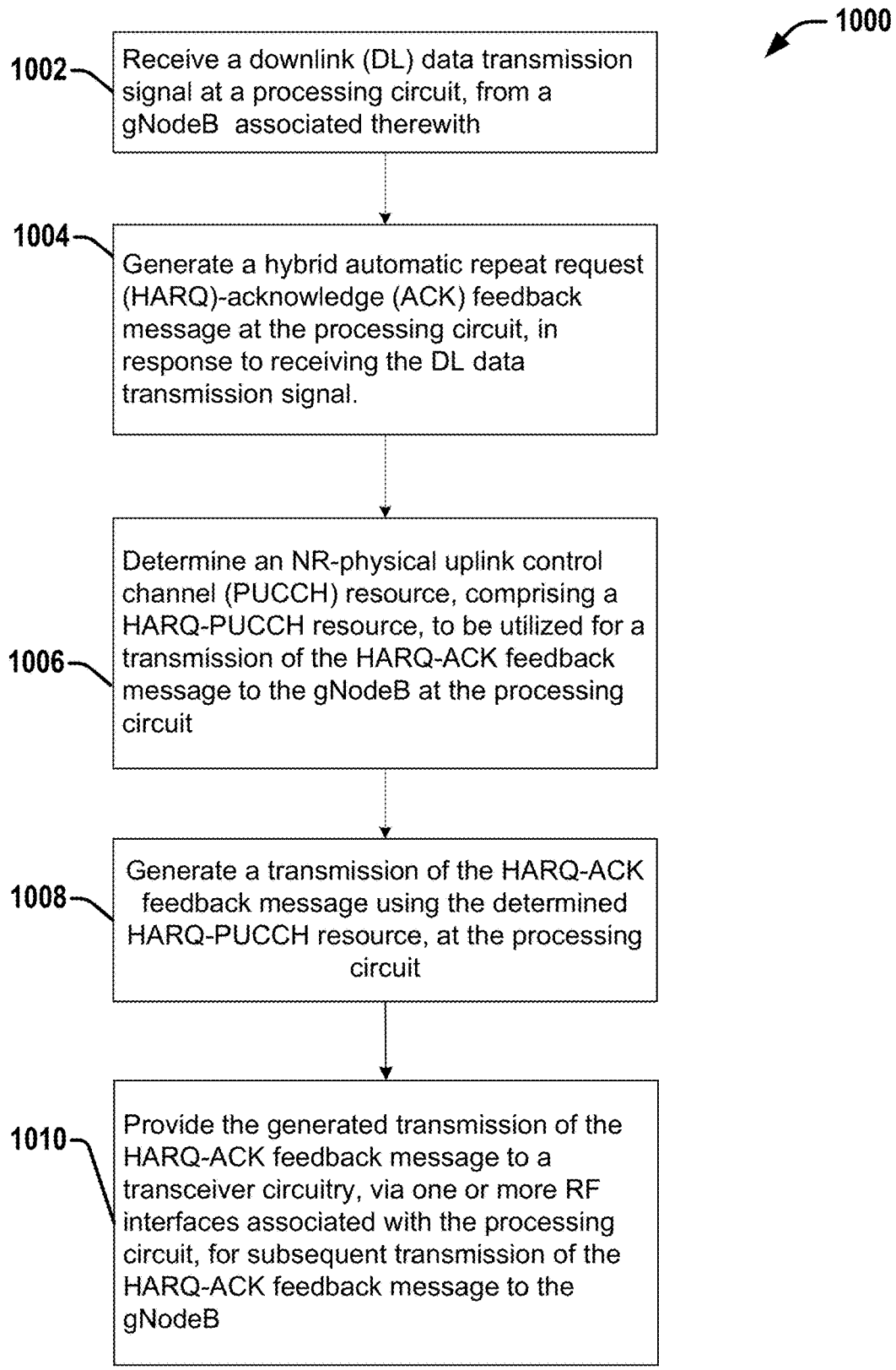
FIG. 10 illustrates a flow chart of a method for a user equipment (UE) in a new radio (NR) system, according to one embodiment of the disclosure.

FIG. 10 illustrates a flow chart of a method 1000 for a user equipment (UE) in a new radio (NR) system, according to one embodiment of the disclosure. The method 1000 is explained herein with reference to the apparatus 800 in FIG. 8. In some embodiments, the apparatus 800 could be included within the UE 104 of FIG. 1, or the UE 404 of FIG. 4 or the UE 504 of FIG. 5. At 1002, a downlink (DL) data transmission signal (e.g., the DL data transmission signal 106 in FIG. 1) is received at the processing circuit 810, from a gNodeB (e.g., the gNodeB 102 in FIG. 1) associated therewith. At 1004, a hybrid automatic repeat request (HARQ)-acknowledge (ACK) feedback message (e.g., the HARQ-ACK feedback message 108 in FIG. 1) is generated at the processing circuit 810, in response to receiving the DL data transmission signal.

At 1006, an NR-physical uplink control channel (PUCCH) resource, comprising a HARQ-PUCCH resource, to be utilized for a transmission of the HARQ-ACK feedback message to the gNodeB, is determined at the processing circuit 810. In some embodiments, the HARQ-PUCH resource is determined at the processing circuit 810 based on processing a configuration information comprising a HARQ-PUCCH resource configuration information received from the gNodeB, further details of which are explained above with respect to FIG. 4 and FIG. 8. Alternately, in some embodiments, the HARQ-PUCH resource is determined at the processing circuit 810, at least partly, based on processing a predefined resource set association between at least two of physical random access channel (PRACH) resource sets, DL control resource sets and NR PUCCH resource sets, received from the gNodeB, further details of which are explained above with respect to FIG. 5 and FIG. 8. Alternately, in some embodiments, the HARQ-PUCH resource is determined at the processing circuit 810 as a predefined function of at least one or more HARQ determination parameters, further details of which are explained above with respect to FIG. 1 and FIG. 8.

Alternately or additionally, in some embodiments, the HARQ-PUCH resource is determined at the processing circuit 810 based on a configuration information comprising a HARQ-ACK resource offset received from the gNodeB, further details of which are explained above with respect to FIG. 1 and FIG. 8. Alternately or additionally, in some embodiments, the HARQ-PUCH resource is determined at the processing circuit 810 based on a predefined resource set association between a temporary cell radio network temporary identifier (TC-RNTI) or Cell Radio Network Temporary Identifier (C-RNTI), and a virtual DL control resource set, further details of which are explained above with respect to FIG. 1 and Fig. At 1008, a transmission of the HARQ-ACK feedback message is generated at the processing circuit 810, using the determined HARQ-PUCCH resource. At 1010, the generated transmission of the HARQ-ACK feedback message is provided to the transceiver circuitry 820, via one or more RF interfaces associated with the processing circuit 810, for subsequent transmission of the HARQ-ACK feedback message to the gNodeB.

Figure 11:
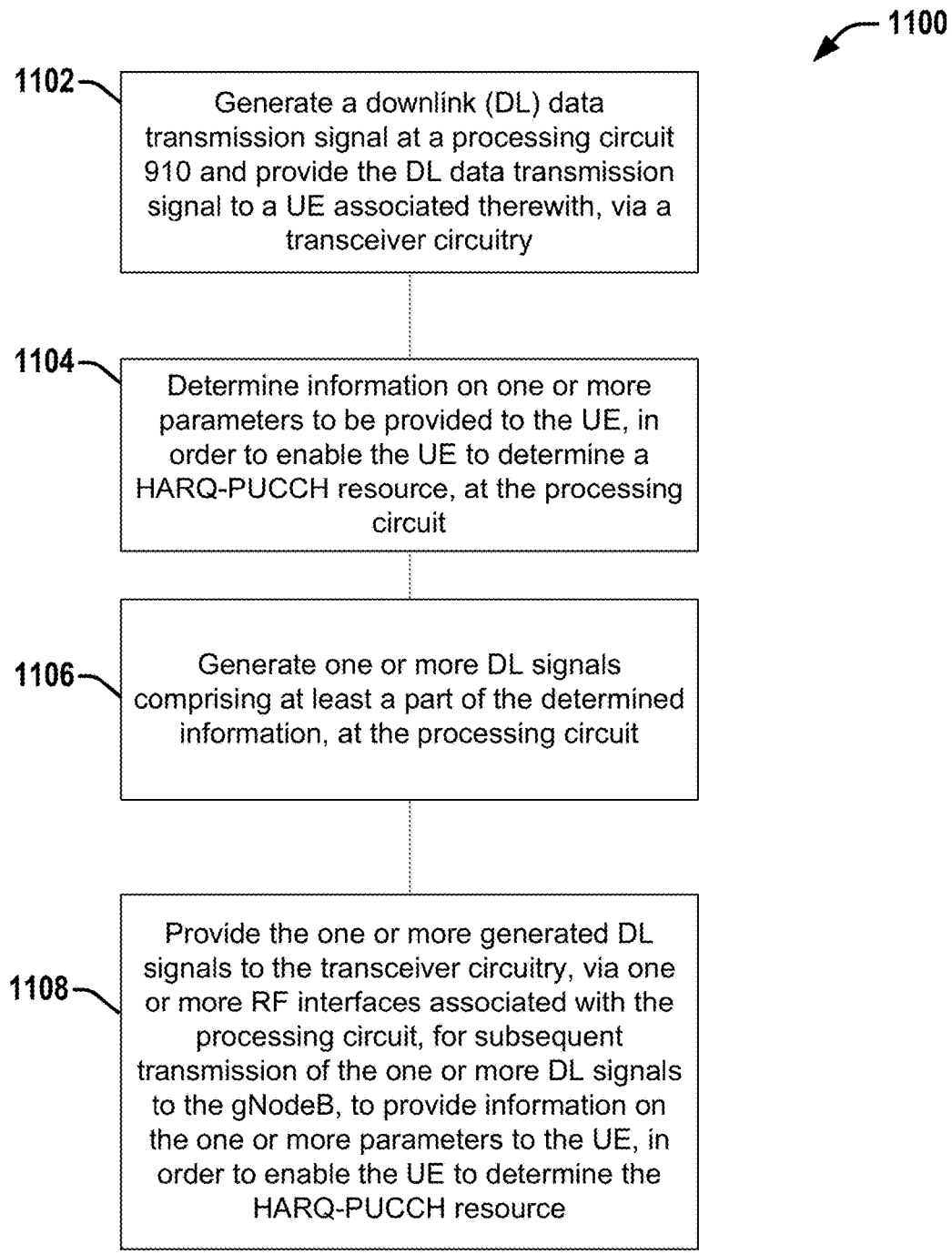
FIG. 11 illustrates a flow chart of a method for a gNodeB in a new radio (NR) system, according to one embodiment of the disclosure.

FIG. 11 illustrates a flow chart of a method 1100 for a gNodeB in a new radio (NR) system, according to one embodiment of the disclosure. The method 1100 is explained herein with reference to the apparatus 900 in FIG. 9. In some embodiments, the apparatus 900 could be included within the gNodeB 102 of FIG. 1, or the gNodeB 402 of FIG. 4 or the UE 502 of FIG. 5. At 1102, a downlink (DL) data transmission signal (e.g., the DL data transmission signal 106 in FIG. 1) is generated at the processing circuit 910 and provided to a UE (e.g., the UE 104 in FIG. 1) associated therewith, via the transceiver circuitry 920. At 1104, information on one or more parameters to be provided to the UE, in order to enable the UE to determine a HARQ-PUCCH resource, is determined at the processing circuit 910. In some embodiments, the HARQ-PUCCH resource is utilized by the UE for a transmission of a HARQ-acknowledge (ACK) feedback message to the gNodeB.

In some embodiments, the information on one or more parameters to be determined at the processing circuit 910 comprises a configuration information comprising a HARQ-PUCCH resource configuration information comprising a set of HARQ-PUCCH resource configuration parameters that define an NR-PUCCH resource, comprising the HARQ-PUCCH resource, further details of which are explained above with respect to FIG. 4 and FIG. 9. Alternately, in some embodiments, the information on one or more parameters determined at the processing circuit 910 comprises a resource set association between predetermined sets of at least two of physical random access channel (PRACH) resource sets, downlink (DL) control resource sets and NR physical uplink control channel (PUCCH) resource sets, further details of which are explained above with respect to FIG. 5 and FIG. 9. Alternately or additionally, in some embodiments, the information on one or more parameters determined at the processing circuit 910 comprises a configuration information comprising a HARQ-ACK resource offset, to be provided to the UE, in order to enable the UE to determine the HARQ-PUCCH resource, further details of which are explained above with respect to FIG. 1 and FIG. 9.

Alternately or additionally, in some embodiments, the information on one or more parameters determined at the processing circuit 910 comprises a resource set association between a temporary cell radio network temporary identifier (TC-RNTI) or Cell Radio Network Temporary Identifier (C-RNTI), and a virtual DL control resource set, further details of which are explained above with respect to FIG. 1 and FIG. 9. Further, in some embodiments, the information on one or more parameters determined at the processing circuit 910 comprises one or more parameters, for example, the configured parameter $D_{PUCCH}$, constants $c_0$, $c_1$, $c_2$ etc. explained above with respect to equation (2) above, to be provided to the UE, in order to enable the UE to determine the HARQ-PUCCH resource.

At 1106, one or more DL signals comprising at least a part of the determined information at 1104 above, is generated at the processing circuit 910. For example, in some embodiments, the one or more DL signals comprises a random access response (RAR) message, system broadcast signal, downlink control information (DCI) etc. as explained above with resects to the various embodiments described above. At 1108, the one or more generated DL signals is provided to the transceiver circuitry 920, via one or more RF interfaces associated with the processing circuit 910, for subsequent transmission of the one or more DL signals to the gNodeB, to provide information on the one or more parameters to the UE, in order to enable the UE to determine the HARQ-PUCCH resource.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Figure 12:
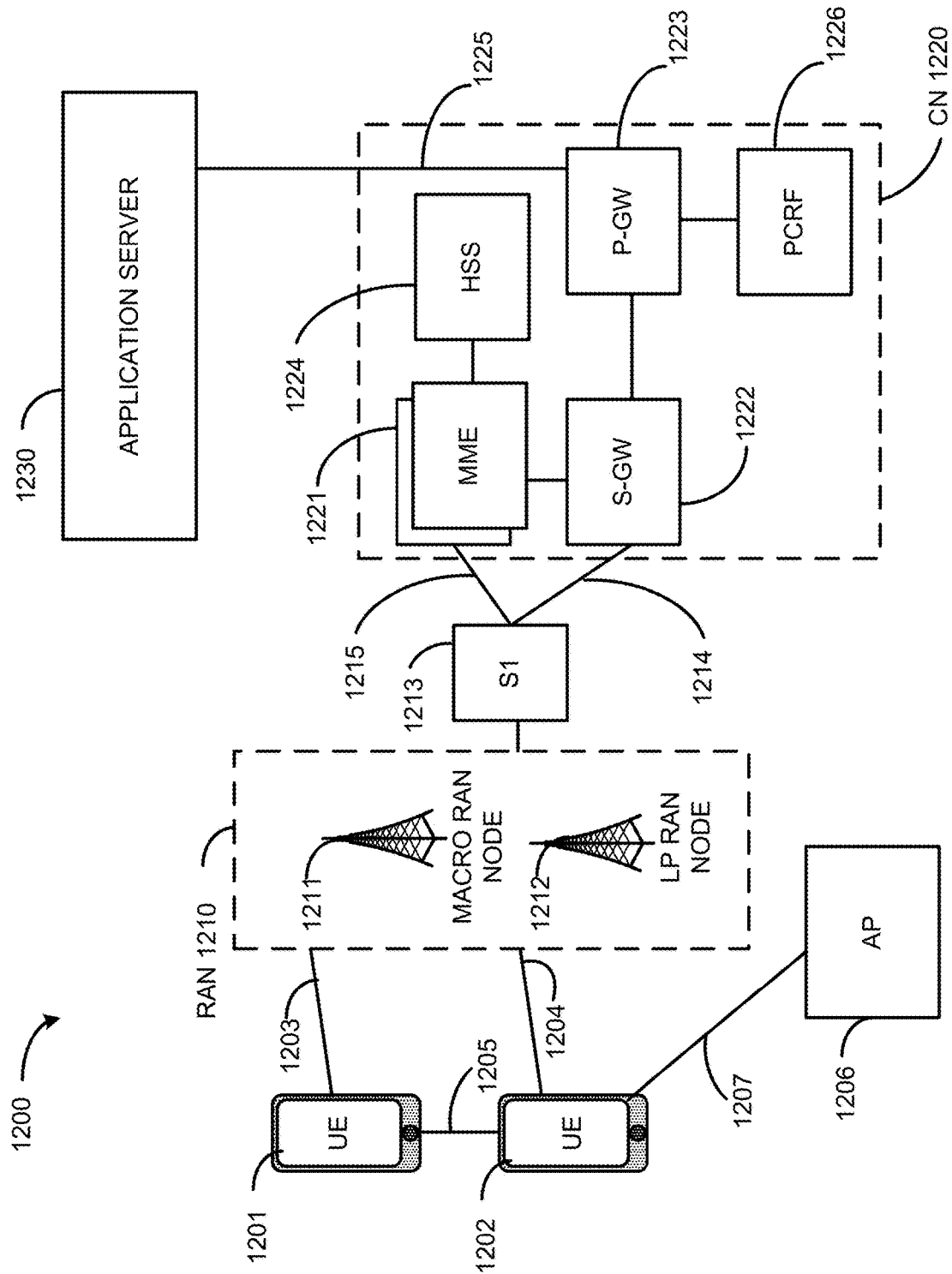
FIG. 12 illustrates an architecture of a system of a network in accordance with some embodiments.

Embodiments described herein can be implemented into a system using any suitably configured hardware and/or software. FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 1201 and 1202 can be configured to connect, e.g., communicatively couple, with a radio access network (RAN) 1210—the RAN 1210 can be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 can further directly exchange communication data via a ProSe interface 1205. The ProSe interface 1205 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 1202.11 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 1210 can include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 1201 and 1202. The physical downlink control channel (PDCCH) can carry information about the transport format and resource allocations related to the PDSCH channel, among other things. It can also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1202 within a cell) can be performed at any of the RAN nodes 1211 and 1212 based on channel quality information fed back from any of the UEs 1201 and 1202. The downlink resource assignment information can be sent on the PDCCH used for (e.g., assigned to) each of the UEs 1201 and 1202.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 12).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 1210 is shown to be communicatively coupled to a core network (CN) 1220—via an S1 interface 1213. In embodiments, the CN 1220 can be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 can be similar in function to the control plane of legacy Serving General Packet Radio Service (GPRS) Support Nodes (SGSN). The MMEs 1221 can manage mobility aspects in access such as gateway selection and tracking area list management. The HSS 1224 can comprise a database for network users, including subscription-related information to support the network entities' handling of communication sessions. The CN 1220 can comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 can terminate the S1 interface 1213 towards the RAN 1210, and routes data packets between the RAN 1210 and the CN 1220. In addition, the S-GW 1222 can be a local mobility anchor point for inter-RAN node handovers and also can provide an anchor for inter-3GPP mobility. Other responsibilities can include lawful intercept, charging, and some policy enforcement.

The P-GW 1223 can terminate an SGi interface toward a PDN. The P-GW 1223 can route data packets between the EPC network 1223 and external networks such as a network including the application server 1230 (alternatively referred to as application function (AF)) via an Internet Protocol (IP) interface 1225. Generally, the application server 1230 can be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 can further be a node for policy enforcement and charging data collection. Policy and Charging Enforcement Function (PCRF) 1226 is the policy and charging control element of the CN 1220. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 can be communicatively coupled to the application server 1230 via the P-GW 1223. The application server 1230 can signal the PCRF 1226 to indicate a new service flow and select the appropriate Quality of Service (QoS) and charging parameters. The PCRF 1226 can provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
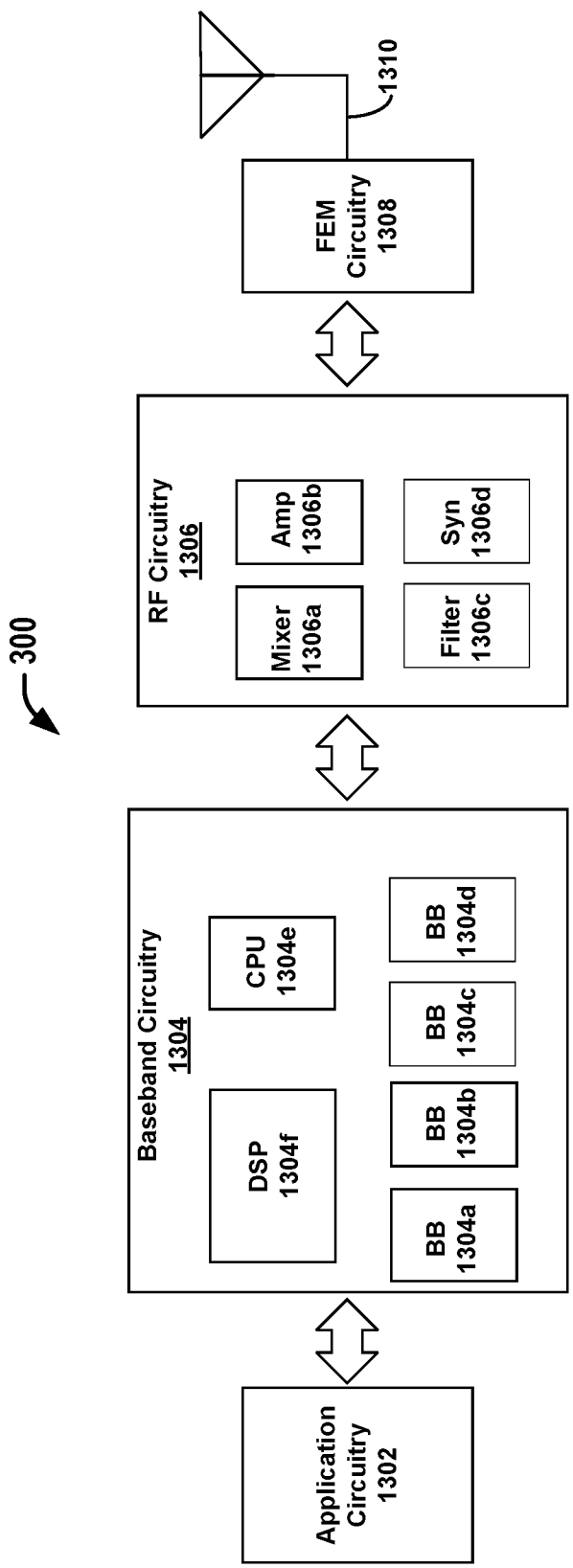
FIG. 13 illustrates example components of a device in accordance with some embodiments.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), si13h generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 13 12 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an e13ended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
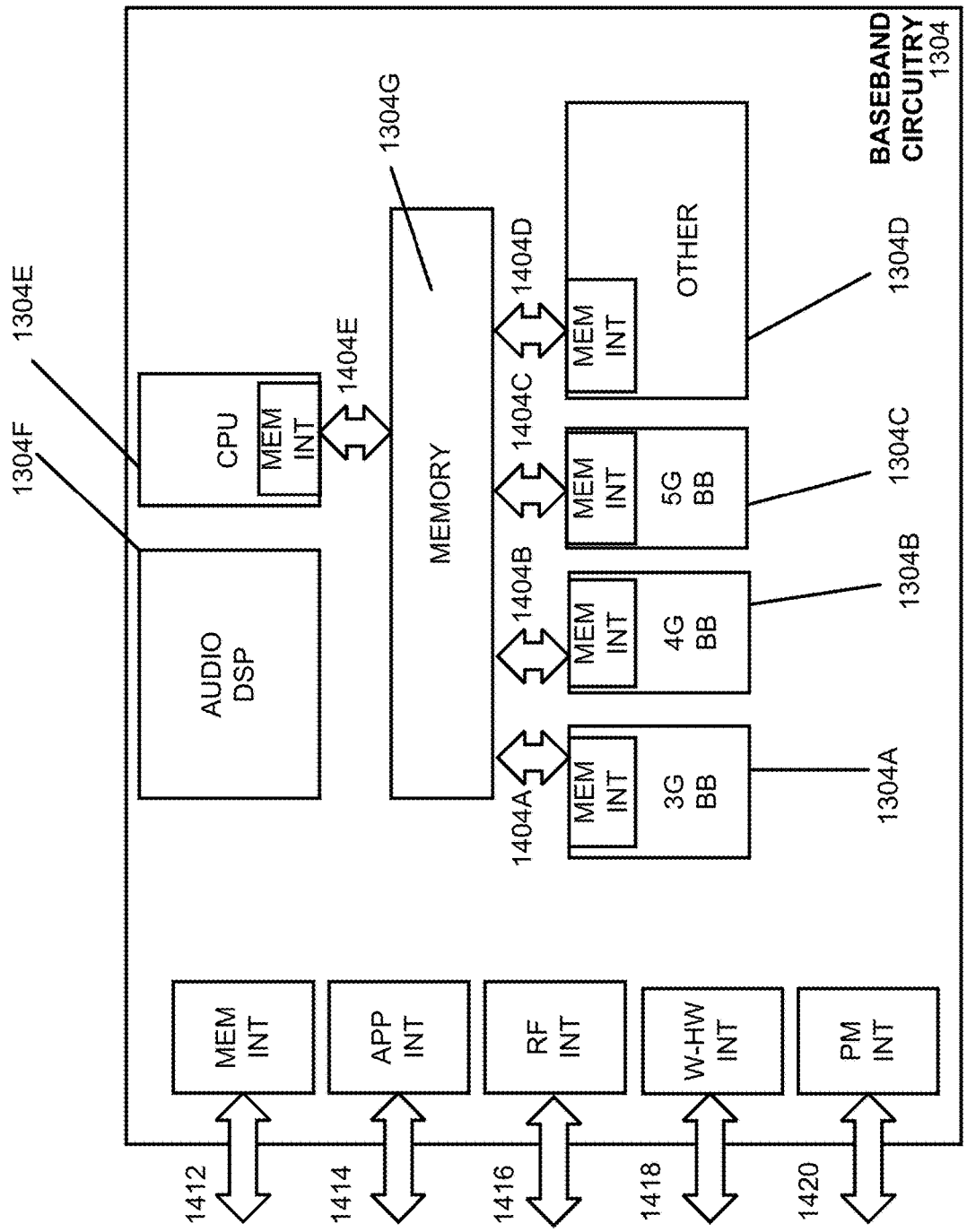
FIG. 14 illustrates example interfaces of baseband circuitry in accordance with some embodiments.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a user equipment (UE) associated with a new radio (NR) communication system, comprising a processing circuit configured to determine an NR-physical uplink control channel (PUCCH) resource to be utilized by the UE for a transmission of a hybrid automatic repeat request (HARQ)-acknowledge (ACK) feedback message to a gNodeB, wherein the HARQ-ACK feedback message comprises a feedback message generated at the UE in response to processing a downlink (DL) data transmission signal comprising data received from the gNodeB, and wherein the determined NR-PUCCH resource comprises a HARQ-PUCCH resource; and generate a transmission of the HARQ-ACK feedback message using the determined HARQ-PUCCH resource; and a radio frequency (RF) interface, configured to provide the generated transmission of the HARQ-ACK feedback message, to an RF circuitry, in order to subsequently provide the HARQ-ACK feedback message to the gNodeB.

Example 2 is an apparatus, including the subject matter of example 1, wherein the DL data transmission signal comprises a UE specific DL data signal received from the gNodeB, prior to the establishment of a radio resource control (RRC) connection between the UE and the gNodeB.

Example 3 is an apparatus, including the subject matter of examples 1-2, including or omitting elements, wherein the processing circuit is configured to determine the HARQ-PUCCH resource based on processing a configuration information comprising a HARQ-PUCCH resource configuration information received from the gNodeB, wherein the HARQ-PUCCH resource configuration information comprises a set of HARQ-PUCCH resource configuration parameters that define the HARQ-PUCCH resource.

Example 4 is an apparatus, including the subject matter of examples 1-3, including or omitting elements, wherein the processing circuit is configured to determine the HARQ-PUCCH resource, at least partly, based on processing a random access response (RAR) message associated with a RACH procedure received from the gNodeB, wherein the RAR message comprises one or more HARQ-PUCCH resource configuration parameters associated with the HARQ-PUCCH resource configuration information.

Example 5 is an apparatus, including the subject matter of examples 1-4, including or omitting elements, wherein the processing circuit is further configured to process a downlink control information (DCI) associated with the DL data transmission signal received from the gNodeB, wherein the DCI comprises one or more HARQ-PUCCH resource configuration parameters associated with the HARQ-PUCCH resource configuration information, in order to determine the HARQ-PUCCH resource.

Example 6 is an apparatus, including the subject matter of examples 1-5, including or omitting elements, wherein the processing circuit is configured to determine the HARQ-PUCCH resource, at least partly, based on processing a system broadcast signal comprising one or more HARQ- PUCCH resource configuration parameters associated with the HARQ-PUCCH resource configuration information, received from the gNodeB.

Example 7 is an apparatus, including the subject matter of examples 1-6, including or omitting elements, wherein the processing circuit is further configured to process a random access response (RAR) message associated with a RACH procedure or a downlink control information (DCI) associated with the DL data transmission signal, or both, wherein both the RAR message and the DCI comprises one or more HARQ-PUCCH resource configuration parameters associated with the HARQ-PUCCH resource configuration information, in order to determine the HARQ-PUCCH resource.

Example 8 is an apparatus, including the subject matter of examples 1-7, including or omitting elements, wherein the processing circuit is further configured to process a system broadcast signal received from the gNodeB, wherein the system broadcast signal comprises information on a subband that define an NR PUCCH region, wherein the NR PUCCH region comprises the HARQ-PUCCH resource for the transmission of HARQ-ACK feedback; and determine the HARQ-PUCCH resource based on the HARQ-PUCCH resource configuration information received from the gNodeB, within the subband that defines the NR PUCCH region.

Example 9 is an apparatus, including the subject matter of examples 1-8, including or omitting elements, wherein the processing circuit is configured to determine the HARQ-PUCCH resource, at least in part, based on a predefined resource set association between at least two of physical random access channel (PRACH) resource sets, DL control resource sets and NR PUCCH resource sets.

Example 10 is an apparatus, including the subject matter of examples 1-9, including or omitting elements, wherein, in order to determine the HARQ-PUCCH resource, the processing circuit is configured to determine a PRACH resource set associated with the UE, based on a PRACH resource selected by the UE for a transmission of a PRACH preamble; determine a corresponding DL control resource set associated with the UE, based on the predefined or configured resource set association; process a downlink control information (DCI) associated with the DL control resource set, wherein the DCI comprises information on the HARQ-PUCCH resource within a corresponding NR PUCCH resource set; and determine the corresponding NR PUCCH resource set comprising the HARQ-PUCCH resource based on the predefined resource set association.

Example 11 is an apparatus, including the subject matter of examples 1-10, including or omitting elements, wherein, in order to determine the HARQ-PUCCH resource, the processing circuit is configured to determine a DL control resource set, based on a downlink control information (DCI) associated with the DL data transmission signal received from the gNodeB, wherein the DCI is associated with the NR physical downlink control channel (PDCCH) resources associated with the DL control resource set; process the downlink control information (DCI) associated with the DL data transmission signal, wherein the DCI comprises information on the HARQ-PUCCH resource within a corresponding NR PUCCH resource set associated with the predefined or configured resource set association between the DL control resource set and the NR PUCCH resource set; and determine the corresponding NR PUCCH resource set comprising the HARQ-PUCCH resource based on the predefined resource set association.

Example 12 is an apparatus, including the subject matter of examples 1-11, including or omitting elements, wherein the processing circuit is configured to determine the HARQ-PUCCH resource as a predefined function of at least one or more HARQ determination parameters.

Example 13 is an apparatus, including the subject matter of examples 1-12, including or omitting elements, wherein the HARQ determination parameters comprises a control channel element (CCE) index, a Demodulation Reference Signal (DM-RS) index or antenna port index used for a corresponding NR physical downlink shared channel (PDSCH) transmission, physical resource block (PRB) index for the corresponding NR PDSCH or NR physical downlink control channel (PDCCH) transmission, physical cell identity (ID) or virtual cell ID, control resource set index, control resource set specific resource offset sub-band index, Cell Radio Network Temporary Identifier (C-RNTI), random access radio network temporary Identifier (RA-RNTI) and/or preamble index for the PRACH in the first step in RACH procedure and a combination of CCE index and PRACH preamble index.

Example 14 is an apparatus, including the subject matter of examples 1-13, including or omitting elements, wherein, for a predefined timing gap after receiving a radio resource control (RRC) reconfiguration message from the gNodeB, the processing circuit is configured to utilize an old HARQ-PUCCH resource comprising a HARQ-PUCCH resource determined at the UE, prior to receiving the RRC reconfiguration message, or a HARQ-PUCCH resource configured by a system broadcast signal or a HARQ-PUCCH resource implicitly derived at the processing circuit, in order to generate a transmission of a HARQ-ACK feedback message.

Example 15 is an apparatus, including the subject matter of examples 1-14, including or omitting elements, wherein, after the predefined timing gap after receiving the RRC reconfiguration message from the gNodeB, the processing circuit is configured to determine a new HARQ-PUCCH resource for the transmission of the HARQ-ACK feedback message, based on a set of NR PUCCH resources configured in the RRC reconfiguration message.

Example 16 is an apparatus, including the subject matter of examples 1-15, including or omitting elements, wherein the processing circuit is configured to determine the HARQ-PUCCH resource, at least partly, based on a configuration information comprising a HARQ-ACK resource offset received from the gNodeB.

Example 17 is an apparatus, including the subject matter of examples 1-16, including or omitting elements, wherein the processing circuit is configured to determine the HARQ-PUCCH resource, at least partly, based on a predefined resource set association between a temporary cell radio network temporary identifier (TC-RNTI) or Cell Radio Network Temporary Identifier (C-RNTI), and a virtual DL control resource set.

Example 18 is an apparatus, including the subject matter of examples 1-17, including or omitting elements, wherein the processing circuit is configured to process a random access response (RAR) message comprising the TC-TNTI or the C-RNTI, determine the corresponding virtual DL control resource set based on the predefined association; and monitor a DL control channel within the virtual DL control resource set, in order to determine the HARQ-PUCCH resource.

Example 19 is an apparatus configured to be employed in a next generation Node B (gNB) associated with a new radio (NR) communication system, comprising a processing circuitry configured to determine a configuration information comprising one or more configuration parameters that define an NR physical uplink control channel (PUCCH) resource, to be provided to a UE, in order to enable the UE to determine the NR PUCCH resource, wherein the NR PUCCH resource comprises a hybrid automatic repeat request (HARQ)-PUCCH resource, to be utilized by the UE for a transmission of a HARQ-acknowledge (ACK) feedback message to the gNodeB, and wherein the HARQ-ACK feedback message comprises a feedback message generated at the UE in response to processing a downlink (DL) data transmission signal comprising data received from the gNodeB; and generate one or more DL signals comprising at least a part of the configuration information, to be provided to the UE, in order to enable the UE to determine the HARQ-PUCCH resource; and a radio frequency (RF) interface, configured to provide the one or more DL signals, to an RF circuitry, for subsequent transmission to the UE.

Example 20 is an apparatus, including the subject matter of example 19, including or omitting elements, wherein the configuration information comprises a HARQ-PUCCH resource configuration information comprising a set of HARQ-PUCCH resource configuration parameters that define the NR-PUCCH resource, comprising the HARQ-PUCCH resource.

Example 21 is an apparatus, including the subject matter of examples 19-20, including or omitting elements, wherein the set of HARQ-PUCCH resource configuration parameters comprises one or more of information on whether short or long NR PUCCH is used, starting symbol and/or duration of NR PUCCH with long duration, whether 1 symbol or 2 symbol is used for NR PUCCH with short duration and corresponding symbol position, frequency resource for the transmission of NR PUCCH with short or long duration, information whether frequency hopping is applied for the transmission of NR PUCCH with short or long duration, cyclic shift index and/or orthogonal cover code (OCC) index for the transmission of NR PUCCH with short or long duration, parameter indicating whether HARQ-ACK repetition is configured and number of PUCCH repetitions.

Example 22 is an apparatus, including the subject matter of examples 19-21, including or omitting elements, wherein the processing circuit is configured to generate a random access response (RAR) message comprising one or more HARQ-PUCCH resource configuration parameters associated with the set of HARQ-PUCCH resource configuration parameters, to be provided to the UE, in order to provide at least a first part of the HARQ-PUCCH resource configuration information to the UE, wherein the RAR message is associated with a random access channel (RACH) procedure.

Example 23 is an apparatus, including the subject matter of examples 19-22, including or omitting elements, wherein the processing circuit is further configured to generate a downlink control information (DCI) comprising one or more HARQ-PUCCH resource configuration parameters associated with the set of HARQ-PUCCH resource configuration parameters, to be provided to the UE, in order to provide a second, different part of the HARQ-PUCCH resource configuration information to the UE, wherein the DCI is associated with the DL data transmission signal.

Example 24 is an apparatus, including the subject matter of examples 19-23, including or omitting elements, wherein the processing circuit is configured to generate a system broadcast signal comprising one or more HARQ-PUCCH resource configuration parameters associated with the set of HARQ-PUCCH resource configuration parameters, to be provided to the UE, in order to provide at least a part of the HARQ-PUCCH resource configuration information to the UE.

Example 25 is an apparatus, including the subject matter of examples 19-24, including or omitting elements, wherein the processing circuit is further configured to generate a random access response (RAR) message associated with a RACH procedure comprising one or more HARQ-PUCCH resource configuration parameters associated with the set of HARQ-PUCCH resource configuration parameters or a downlink control information (DCI) associated with the DL data transmission signal comprising one or more HARQ-PUCCH resource configuration parameters associated with the set of HARQ-PUCCH resource configuration parameters, or both, to be provided to the UE, in order to provide another part of the HARQ-PUCCH resource configuration information to the UE.

Example 26 is an apparatus, including the subject matter of examples 19-25, including or omitting elements, wherein the configuration information comprises a HARQ-ACK resource offset, to be provided to the UE, in order to enable the UE to determine the HARQ-PUCCH resource.

Example 27 is an apparatus, including the subject matter of examples 19-26, including or omitting elements, wherein the processing circuit is configured to provide the DL data transmission signal to the UE, prior to an establishment of a radio resource control (RRC) connection between the UE and the gNodeB, wherein the DL data transmission signal comprises a UE specific DL data signal.

Example 28 is an apparatus configured to be employed in a next generation Node B (gNB) associated with a new radio (NR) communication system, comprising a processing circuitry configured to determine a resource set association associated with one or more predefined resource sets, each resource set comprising a set of resources associated with the NR communication system, to be provided to a UE, in order to enable the UE to determine an NR PUCCH resource, comprising a hybrid automatic repeat request (HARQ)-PUCCH resource, to be utilized by the UE for a transmission of a HARQ-acknowledge (ACK) feedback message to the gNodeB, wherein the HARQ-ACK feedback message comprises a feedback message generated at the UE in response to processing a downlink (DL) data transmission signal comprising data received from the gNodeB; and generate one or more DL signals comprising information on the determined resource set association, in order to provide the information on the determined resource set association to the UE; and a radio frequency (RF) interface, configured to provide the one or more DL signals, to an RF circuitry, for subsequent transmission to the UE.

Example 29 is an apparatus, including the subject matter of example 28, wherein the resource set association comprises a resource set association between predetermined sets of at least two of physical random access channel (PRACH) resource sets, downlink (DL) control resource sets and NR physical uplink control channel (PUCCH) resource sets.

Example 30 is an apparatus, including the subject matter of examples 28-29, including or omitting elements, wherein the processing circuit is configured to generate a system broadcast signal comprising information on the determined resource set association, to be provided to the UE, in order to provide the information on the determined resource set association to the UE.

Example 31 is an apparatus, including the subject matter of examples 28-30, including or omitting elements, wherein the processing circuit is further configured to generate a downlink control information (DCI) comprising information on the HARQ-PUCCH resource within a NR PUCCH resource set associated with the resource set association, to be provided to the UE, in order to enable the UE to determine the HARQ-PUCCH resource, wherein the DCI is associated with a corresponding DL control resource set of the resource set association.

Example 32 is an apparatus, including the subject matter of examples 28-31, including or omitting elements, wherein the resource set association comprises a resource set association between a temporary cell radio network temporary identifier (TC-RNTI) or Cell Radio Network Temporary Identifier (C-RNTI), and a virtual DL control resource set.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a user equipment (UE) associated with a new radio (NR) communication system, comprising:
    a processing circuit configured to:
        determine an NR-physical uplink control channel (PUCCH) resource to be utilized by the UE for a transmission of a hybrid automatic repeat request (HARQ)-acknowledge (ACK) feedback message to a gNodeB, wherein the HARQ-ACK feedback message comprises a feedback message generated at the UE in response to processing a downlink (DL) data transmission signal comprising data received from the gNodeB, and wherein the determined NR-PUCCH resource comprises a HARQ-PUCCH resource; and
        generate a transmission of the HARQ-ACK feedback message using the determined HARQ-PUCCH resource; and
    a radio frequency (RF) interface, configured to provide the generated transmission of the HARQ-ACK feedback message, to an RF circuitry, in order to subsequently provide the HARQ-ACK feedback message to the gNodeB.

2. The apparatus of claim 1, wherein the DL data transmission signal comprises a UE specific DL data signal received from the gNodeB, prior to the establishment of a radio resource control (RRC) connection between the UE and the gNodeB.

3. The apparatus of claim 1, wherein the processing circuit is configured to determine the HARQ-PUCCH resource based on processing a configuration information comprising a HARQ-PUCCH resource configuration information received from the gNodeB, wherein the HARQ-PUCCH resource configuration information comprises a set of HARQ-PUCCH resource configuration parameters that define the HARQ-PUCCH resource.

4. The apparatus of claim 3, wherein the processing circuit is configured to determine the HARQ-PUCCH resource, at least partly, based on processing a random access response (RAR) message associated with a RACH procedure received from the gNodeB, wherein the RAR message comprises one or more HARQ-PUCCH resource configuration parameters associated with the HARQ-PUCCH resource configuration information.

5. The apparatus of claim 4, wherein the processing circuit is further configured to process a downlink control information (DCI) associated with the DL data transmission signal received from the gNodeB, wherein the DCI comprises one or more HARQ-PUCCH resource configuration parameters associated with the HARQ-PUCCH resource configuration information, in order to determine the HARQ-PUCCH resource.

6. The apparatus of claim 3, wherein the processing circuit is configured to determine the HARQ-PUCCH resource, at least partly, based on processing a system broadcast signal comprising one or more HARQ-PUCCH resource configuration parameters associated with the HARQ-PUCCH resource configuration information, received from the gNodeB.

7. The apparatus of claim 6, wherein the processing circuit is further configured to process a random access response (RAR) message associated with a RACH procedure or a downlink control information (DCI) associated with the DL data transmission signal, or both, wherein both the RAR message and the DCI comprises one or more HARQ-PUCCH resource configuration parameters associated with the HARQ-PUCCH resource configuration information, in order to determine the HARQ-PUCCH resource.

8. The apparatus of claim 3, wherein the processing circuit is further configured to:
    process a system broadcast signal received from the gNodeB, wherein the system broadcast signal comprises information on a subband that define an NR PUCCH region, wherein the NR PUCCH region comprises the HARQ-PUCCH resource for the transmission of HARQ-ACK feedback; and determine the HARQ-PUCCH resource based on the HARQ-PUCCH resource configuration information received from the gNodeB, within the subband that defines the NR PUCCH region.

9. The apparatus of claim 1, wherein the processing circuit is configured to determine the HARQ-PUCCH resource, at least in part, based on a predefined resource set association between at least two of physical random access channel (PRACH) resource sets, DL control resource sets and NR PUCCH resource sets.

10. The apparatus of claim 9, wherein, in order to determine the HARQ-PUCCH resource, the processing circuit is configured to:
  determine a PRACH resource set associated with the UE, based on a PRACH resource selected by the UE for a transmission of a PRACH preamble;
  determine a corresponding DL control resource set associated with the UE, based on the determined PRACH resource set, in accordance with a resource set association between the PRACH resource set and the DL control resource sets defined within the predefined resource set association;
  process a downlink control information (DCI) associated with the DL control resource set, wherein the DCI comprises information on the HARQ-PUCCH resource within a corresponding NR PUCCH resource set; and
  determine the corresponding NR PUCCH resource set comprising the HARQ-PUCCH resource based on the determined DL control resource set, in accordance with a resource set association between the DL resource set and NR PUCCH resource sets defined within the predefined resource set association.

11. The apparatus of claim 9, wherein, in order to determine the HARQ-PUCCH resource, the processing circuit is configured to:
  determine a DL control resource set, based on a downlink control information (DCI) associated with the DL data transmission signal received from the gNodeB, wherein the DCI is associated with the NR physical downlink control channel (PDCCH) resources associated with the DL control resource set;
  process the downlink control information (DCI) associated with the DL data transmission signal, wherein the DCI comprises information on the HARQ-PUCCH resource within a corresponding NR PUCCH resource set associated with the predefined or configured resource set association between the DL control resource set and the NR PUCCH resource set; and
  determine the corresponding NR PUCCH resource set comprising the HARQ-PUCCH resource based on the predefined resource set association.

12. The apparatus of claim 1, wherein the processing circuit is configured to determine the HARQ-PUCCH resource as a predefined function of at least one or more HARQ determination parameters.

13. The apparatus of claim 12, wherein the HARQ determination parameters comprises a control channel element (CCE) index, a Demodulation Reference Signal (DM-RS) index or antenna port index used for a corresponding NR physical downlink shared channel (PDSCH) transmission, physical resource block (PRB) index for the corresponding NR PDSCH or NR physical downlink control channel (PDCCH) transmission, physical cell identity (ID) or virtual cell ID, control resource set index, control resource set specific resource offset sub-band index, Cell Radio Network Temporary Identifier (C-RNTI), random access radio network temporary Identifier (RA-RNTI) and/or preamble index for the PRACH in the first step in RACH procedure and a combination of CCE index and PRACH preamble index.

14. The apparatus of claim 1, wherein, for a predefined timing gap after receiving a radio resource control (RRC) reconfiguration message from the gNodeB, the processing circuit is configured to utilize an old HARQ-PUCCH resource comprising a HARQ-PUCCH resource determined at the UE, prior to receiving the RRC reconfiguration message, or a HARQ-PUCCH resource configured by a system broadcast signal or a HARQ-PUCCH resource implicitly derived at the processing circuit, in order to generate a transmission of a HARQ-ACK feedback message.

15. The apparatus of claim 14, wherein, after the predefined timing gap after receiving the RRC reconfiguration message from the gNodeB, the processing circuit is configured to determine a new HARQ-PUCCH resource for the transmission of the HARQ-ACK feedback message, based on a set of NR PUCCH resources configured in the RRC reconfiguration message.

16. The apparatus of claim 1, wherein the processing circuit is configured to determine the HARQ-PUCCH resource, at least partly, based on a configuration information comprising a HARQ-ACK resource offset received from the gNodeB.

17. The apparatus of claim 1, wherein the processing circuit is configured to determine the HARQ-PUCCH resource, at least partly, based on a predefined resource set association between a temporary cell radio network temporary identifier (TC-RNTI) or Cell Radio Network Temporary Identifier (C-RNTI), and a virtual DL control resource set.

18. The apparatus of claim 17, wherein the processing circuit is configured to:
  process a random access response (RAR) message comprising the TC-TNTI or the C-RNTI, determine the corresponding virtual DL control resource set based on the predefined association; and
  monitor a DL control channel within the virtual DL control resource set, in order to determine the HARQ-PUCCH resource.

19. An apparatus configured to be employed in a next generation Node B (gNB) associated with a new radio (NR) communication system, comprising:
  processing circuitry configured to:
    determine a configuration information comprising one or more configuration parameters that define an NR physical uplink control channel (PUCCH) resource, to be provided to a UE, in order to enable the UE to determine the NR PUCCH resource, wherein the NR PUCCH resource comprises a hybrid automatic repeat request (HARQ)-PUCCH resource, to be utilized by the UE for a transmission of a HARQ-acknowledge (ACK) feedback message to the gNodeB, and wherein the HARQ-ACK feedback message comprises a feedback message generated at the UE in response to processing a downlink (DL) data transmission signal comprising data received from the gNodeB; and
    generate one or more DL signals comprising at least a part of the configuration information, to be provided to the UE, in order to enable the UE to determine the HARQ-PUCCH resource; and
  a radio frequency (RF) interface, configured to provide the one or more DL signals, to an RF circuitry, for subsequent transmission to the UE.

20. The apparatus of claim 19, wherein the configuration information comprises a HARQ-PUCCH resource configuration information comprising a set of HARQ-PUCCH resource configuration parameters that define the NR-PUCCH resource, comprising the HARQ-PUCCH resource.

21. The apparatus of claim 20, wherein the set of HARQ-PUCCH resource configuration parameters comprises one or more of information on whether short or long NR PUCCH is used, starting symbol and/or duration of NR PUCCH with long duration, whether 1 symbol or 2 symbol is used for NR PUCCH with short duration and corresponding symbol position, frequency resource for the transmission of NR PUCCH with short or long duration, information whether frequency hopping is applied for the transmission of NR PUCCH with short or long duration, cyclic shift index and/or orthogonal cover code (OCC) index for the transmission of NR PUCCH with short or long duration, parameter indicating whether HARQ-ACK repetition is configured and number of PUCCH repetitions.

22. The apparatus of claim 20, wherein the processing circuit is configured to generate a random access response (RAR) message comprising one or more HARQ-PUCCH resource configuration parameters associated with the set of HARQ-PUCCH resource configuration parameters, to be provided to the UE, in order to provide at least a first part of the HARQ-PUCCH resource configuration information to the UE, wherein the RAR message is associated with a random access channel (RACH) procedure.

23. The apparatus of claim 22, wherein the processing circuit is further configured to generate a downlink control information (DCI) comprising one or more HARQ-PUCCH resource configuration parameters associated with the set of HARQ-PUCCH resource configuration parameters, to be provided to the UE, in order to provide a second, different part of the HARQ-PUCCH resource configuration information to the UE, wherein the DCI is associated with the DL data transmission signal.

24. The apparatus of claim 20, wherein the processing circuit is configured to generate a system broadcast signal comprising one or more HARQ-PUCCH resource configuration parameters associated with the set of HARQ-PUCCH resource configuration parameters, to be provided to the UE, in order to provide at least a part of the HARQ-PUCCH resource configuration information to the UE.

25. The apparatus of claim 24, wherein the processing circuit is further configured to generate a random access response (RAR) message associated with a RACH procedure comprising one or more HARQ-PUCCH resource configuration parameters associated with the set of HARQ-PUCCH resource configuration parameters or a downlink control information (DCI) associated with the DL data transmission signal comprising one or more HARQ-PUCCH resource configuration parameters associated with the set of HARQ-PUCCH resource configuration parameters, or both, to be provided to the UE, in order to provide another part of the HARQ-PUCCH resource configuration information to the UE.

26. The apparatus of claim 19, wherein the configuration information comprises a HARQ-ACK resource offset, to be provided to the UE, in order to enable the UE to determine the HARQ-PUCCH resource.

27. The apparatus of claim 19, wherein the processing circuit is configured to provide the DL data transmission signal to the UE, prior to an establishment of a radio resource control (RRC) connection between the UE and the gNodeB, wherein the DL data transmission signal comprises a UE specific DL data signal.

28. An apparatus configured to be employed in a next generation Node B (gNB) associated with a new radio (NR) communication system, comprising:
a processing circuitry configured to:
determine a resource set association associated with one or more predefined resource sets, each resource set comprising a set of resources associated with the NR communication system, to be provided to a UE, in order to enable the UE to determine an NR physical uplink control channel LPUCCHI resource, comprising a hybrid automatic repeat request (HARQ)-PUCCH resource, to be utilized by the UE for a transmission of a HARQ-acknowledge (ACK) feedback message to the gNodeB, wherein the HARQ-ACK feedback message comprises a feedback message generated at the UE in response to processing a downlink (DL) data transmission signal comprising data received from the gNodeB; and
generate one or more DL signals comprising information on the determined resource set association, in order to provide the information on the determined resource set association to the UE; and
a radio frequency (RF) interface, configured to provide the one or more DL signals, to an RF circuitry, for subsequent transmission to the UE.

29. The apparatus of claim 28, wherein the resource set association comprises a resource set association between predetermined sets of at least two of physical random access channel (PRACH) resource sets, downlink (DL) control resource sets and NR physical uplink control channel (PUCCH) resource sets.

30. The apparatus of claim 29, wherein the processing circuit is configured to generate a system broadcast signal comprising information on the determined resource set association, to be provided to the UE, in order to provide the information on the determined resource set association to the UE.

31. The apparatus of claim 30, wherein the processing circuit is further configured to generate a downlink control information (DCI) comprising information on the HARQ-PUCCH resource within a NR PUCCH resource set associated with the resource set association, to be provided to the UE, in order to enable the UE to determine the HARQ-PUCCH resource, wherein the DCI is associated with a corresponding DL control resource set of the resource set association.

32. The apparatus of claim 28, wherein the resource set association comprises a resource set association between a temporary cell radio network temporary identifier (TC-RNTI) or Cell Radio Network Temporary Identifier (C-RNTI), and a virtual DL control resource set.

* * * * *